United States Patent
Srinivasamurthy et al.

(10) Patent No.: US 11,432,194 B2
(45) Date of Patent: Aug. 30, 2022

(54) LOAD MEASUREMENT AND LOAD BALANCING FOR PACKET PROCESSING IN A LONG TERM EVOLUTION EVOLVED NODE B

(71) Applicant: CommScope Technologies LLC, Hickory, NC (US)

(72) Inventors: Vagish Srinivasamurthy, Bangalore (IN); Veeresh Salankimatt, Bengaluru (IN)

(73) Assignee: CommScope Technologies LLC, Hickory, NC (US)

( * ) Notice: Subject to any disclaimer, the term of this patent is extended or adjusted under 35 U.S.C. 154(b) by 20 days.

(21) Appl. No.: 16/544,194

(22) Filed: Aug. 19, 2019

(65) Prior Publication Data

US 2020/0128440 A1 Apr. 23, 2020

Related U.S. Application Data

(60) Provisional application No. 62/748,662, filed on Oct. 22, 2018.

(51) Int. Cl.
  H04W 28/08 (2009.01)
  H04W 28/02 (2009.01)
  (Continued)

(52) U.S. Cl.
  CPC ......... *H04W 28/08* (2013.01); *H04L 43/0882* (2013.01); *H04L 43/16* (2013.01);
  (Continued)

(58) Field of Classification Search
  CPC ........... H04W 28/08; H04W 36/00835; H04W 28/0215; H04W 36/0016; H04W 36/22;
  (Continued)

(56) References Cited

U.S. PATENT DOCUMENTS

2009/0106571 A1 4/2009 Low et al.
2009/0163223 A1* 6/2009 Casey ................... H04W 36/22
                                                455/453

(Continued)

FOREIGN PATENT DOCUMENTS

KR   20170074627 A   6/2017
WO   2012005992 A2   1/2012
WO   2013178394 A1   12/2013

OTHER PUBLICATIONS

3GPP, "3rd Generation Partnership Project; Technical Specification Group Radio Access Network; Evolved Universal Terrestrial Radio Access (U-TRA); Medium Access Control (MAC) protocol specification (Release 15)", 3GPP TS 36.321 V15.2.0, Jul. 2018, pp. 1-126, 3GPP.

(Continued)

*Primary Examiner* — Obaidul Huq
(74) *Attorney, Agent, or Firm* — Fogg & Powers LLC

(57) ABSTRACT

A controller that processes signals in a baseband frequency band is described. The controller includes a plurality of processing engines (PEs). The controller also includes a distributor/load balancer that includes at least one processor or processing core. The at least one processor or processing core is configured to (1) enter a first mode in which each new UE session is assigned to a PE that is currently processing a fewest number of UE sessions; (2) determine whether a processing load differential between a least loaded PE and a highest loaded PE exceed a first threshold for at least a time threshold; and (3) in response to the processing load differential between the least loaded PE and the highest loaded PE exceeding the first threshold for at least the time threshold, enter a second mode in which each new UE session is assigned to the least loaded PE.

28 Claims, 10 Drawing Sheets

(51) Int. Cl.
| | |
|---|---|
| *H04L 67/1008* | (2022.01) |
| *H04L 43/16* | (2022.01) |
| *H04L 47/125* | (2022.01) |
| *H04W 36/00* | (2009.01) |
| *H04W 36/22* | (2009.01) |
| *H04L 43/0882* | (2022.01) |

(52) U.S. Cl.
CPC ........ *H04L 47/125* (2013.01); *H04L 67/1008* (2013.01); *H04W 28/0215* (2013.01); *H04W 36/0016* (2013.01); *H04W 36/00835* (2018.08); *H04W 36/22* (2013.01)

(58) Field of Classification Search
CPC ... H04L 43/0882; H04L 43/16; H04L 47/125; H04L 67/1008
USPC .......................................... 370/229, 230, 232
See application file for complete search history.

(56) References Cited

U.S. PATENT DOCUMENTS

| | | | |
|---|---|---|---|
| 2010/0149966 A1* | 6/2010 | Achlioptas | H04L 67/1008 370/217 |
| 2011/0058478 A1* | 3/2011 | Krym | H04W 28/08 370/237 |
| 2014/0029431 A1* | 1/2014 | Haberland | H02J 1/14 370/235 |
| 2016/0174103 A9 | 6/2016 | Harrang | |
| 2017/0063979 A1 | 3/2017 | Saeki | |
| 2017/0280356 A1* | 9/2017 | Wu | H04W 72/1252 |

OTHER PUBLICATIONS

3GPP, "3rd Generation Partnership Project; Technical Specification Group Radio Access Network; Evolved Universal Terrestrial Radio Access (U-TRA); Radio Link Control (RLC) protocol specification (Release 15)", 3GPP TS 36.322 V15.1.0, Jul. 2018, pp. 1-45, 3GPP.
3GPP, "3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.0.0, Jul. 2018, pp. 1-51, 3GPP.
International Searching Authority, "International Search Report and Written Opinion from PCT Application No. PCT/US2019/047033", from Foreign Counterpart to U.S. Appl. No. 16/544,194, dated Dec. 2, 2019, pp. 1-11, Published: WO.
European Patent Office, "Extended European Search Report from EP Application No. 19876193.4", from Foreign Counterpart to U.S. Appl. No. 16/544,194, filed May 3, 2022, pp. 1 through 10, Published: EP.
MCN (Mobile Cloud Networking), "Future Communication Architecture for Mobile Cloud Services" Version 0.9, pp. 1 through 255, Nov. 8, 2013, (c) Mobile Cloud Networking Consortium 2012-2015.

* cited by examiner

LOAD MEASUREMENT AND LOAD BALANCING FOR PACKET PROCESSING IN A LONG TERM EVOLUTION EVOLVED NODE B

CROSS-REFERENCE TO RELATED APPLICATIONS

This application claims the benefit of U.S. Provisional Patent Application Ser. No. 62/748,662 filed on Oct. 22, 2018, entitled "LOAD MEASUREMENT AND LOAD BALANCING FOR PACKET PROCESSING IN A LONG TERM EVOLUTION EVOLVED NODE B", the entirety of which is incorporated herein by reference.

BACKGROUND

The magnitude of traffic on a Long Term Evolution (LTE) eNB can vary significantly depending on the activity of individual UEs. In order to ensure good performance on an eNB, it is desirable to evenly distribute and balance incoming traffic load among available processors. Accordingly, the present systems and methods describe load measurement and load balancing for packet processing in an LTE eNB.

SUMMARY

A controller that processes signals in a baseband frequency band is described. The controller includes a plurality of processing engines (PEs). The controller also includes a distributor/load balancer that includes at least one processor or processing core. The at least one processor or processing core is configured to (1) enter a first mode in which each new UE session is assigned to a PE that is currently processing a fewest number of UE sessions; (2) determine whether a processing load differential between a least loaded PE and a highest loaded PE exceed a first threshold for at least a time threshold; and (3) in response to the processing load differential between the least loaded PE and the highest loaded PE exceeding the first threshold for at least the time threshold, enter a second mode in which each new UE session is assigned to the least loaded PE.

A method is also described. The method is performed by a controller that includes a plurality of processing engines (PEs) and a distributor/load balancer, the method comprising. The method includes entering a first mode in which each new UE session is assigned to a PE that is currently processing a fewest number of UE sessions. The method also includes determining whether a processing load differential between a least loaded PE and a highest loaded PE exceed a first threshold for at least a time threshold. The method also includes, in response to the processing load differential between the least loaded PE and the highest loaded PE exceeding the first threshold for at least the time threshold, entering a second mode in which each new UE session is assigned to the least loaded PE.

DRAWINGS

Understanding that the drawings depict only exemplary configurations and are not therefore to be considered limiting in scope, the exemplary configurations will be described with additional specificity and detail through the use of the accompanying drawings, in which.

Figure 1:
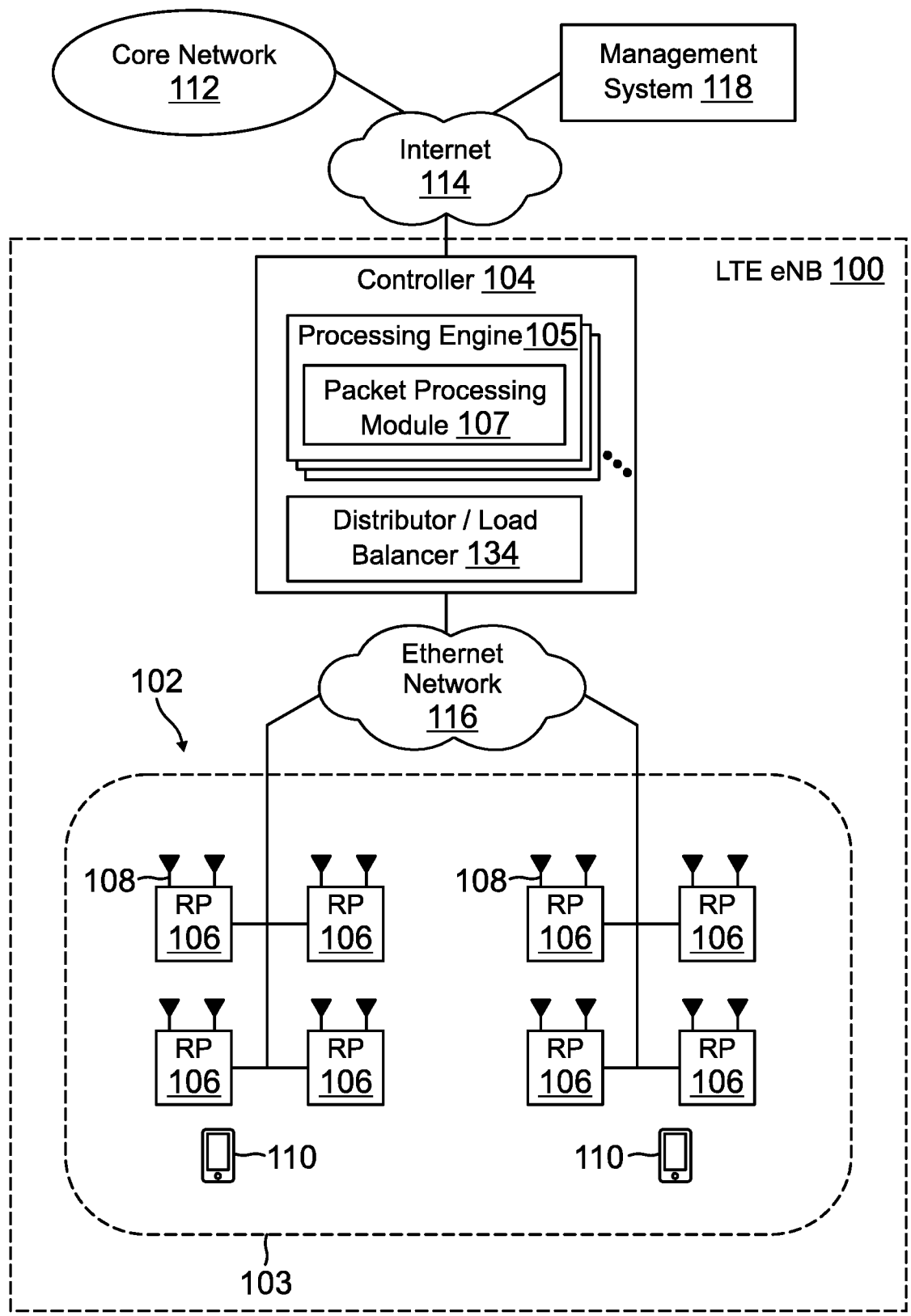
FIG. 1 is a block diagram illustrating one exemplary configuration of a system implementing load measurement and load balancing for packet processing in an LTE eNB.

In accordance with common practice, the various described features are not drawn to scale but are drawn to emphasize specific features relevant to the exemplary configurations.

DETAILED DESCRIPTION

The following terms and acronyms are used herein:
MAC: Medium Access Control; a protocol layer in LTE, e.g., as defined in 3rd Generation Partnership Project (3GPP) Technical Specification (TS) 36.321;
GTP: General Packet Radio Services (GPRS) Tuning Protocol; a protocol layer in LTE;
PDCP: Packet Data Convergence Protocol, e.g., as defined in 3GPP TS 36.323;
RLC: Radio Link Control; a protocol layer in LTE, e.g., as defined in 3GPP TS 36.322;
eNB: evolved Node B; a base station implementing LTE Radio Access Technology, e.g., as defined in 3GPP TS 21.905;
PDU: Protocol Data Unit;
RLF: Radio Link Failure;
LUT: Lookup Table; an indexed table in memory that lets an output value be fetched from memory based on given index;
round(x): a function call that returns the nearest integer value to the decimal number x;
OM: Operational Measurements; and
SmartReuse: Feature that allows UEs (that are sufficiently isolated from each other) in different parts of the cells to use the same time-frequency resources.

3GPP TS 36.322 v15.2.0 (2018-07) (available at http://www.3gpp.org/ftp//Specs/archive/36_series/36.321/36321-f20.zip), 3GPP TS 36.322 v15.1.0 (2018-07) (available at http://www.3gpp.org/ftp//Specs/archive/36_series/36.322/36322-f10.zip), and 3GPP TS 36.323 v15.0.0 (2018-07) (available at http://www.3gpp.org/ftp//Specs/archive/36_series/36.323/36323-f00.zip) are incorporated by reference.

There are several enhancements in 3GPP LTE (from Release 10 onwards) that allow for increasing cell capacity in terms of peak and average data rates (throughput in Mbps), e.g., Carrier Aggregation (CA), as well as higher order and advanced multiple-input multiple-output (MIMO)

techniques. With these enhancements, requirements for data handling capacity in an eNB go up significantly, e.g., compared to the basic Release 8 implementation. When these advancements are combined with techniques such as SmartReuse, processing demands in the eNB increase further. For example, a C-RAN implementation of an LTE eNB may support four to eight times the data rate (for each cell) compared to a conventional eNB.

This increased throughput impacts the packet processing layers of an eNB, namely, GPRS Tunneling Protocol (GTP), Packet Data Convergence Protocol (PDCP), and Radio Link Control (RLC). The eNB modules implementing these packet processing layers need to increase their processing capabilities on the same order as the increase in required throughput. This may be addressed by employing parallel processing platforms or architectures that provides several processing cores on the same chip with all the cores having access to a shared memory bank. The overall workload (which in this case is the combined traffic from several users) may be split and distributed to different processing cores and processed in parallel to achieve higher performance.

The magnitude of traffic on an eNB can vary significantly depending on the activity of individual UEs. Hence, to ensure good performance, even distribution and balancing of incoming traffic load is important. The present systems and methods describe load measurement and load balancing for packet processing in an LTE eNB, e.g., a centralized radio access network (C-RAN) or a macro base station. It should be noted that the present strategies and methods can be applied in general to any parallel packet processing system.

FIG. 1 is a block diagram illustrating one exemplary configuration of an LTE eNB 100 implementing load measurement and load balancing for packet processing. The eNB 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary configuration shown in FIG. 1, the eNB 100 is implemented using a centralized radio access network (C-RAN) (point-to-multipoint distributed base station) architecture that employs at least one baseband unit 104 and multiple radio points (RPs) 106 to serve at least one cell 103. The eNB 100 is also referred to here as a "C-RAN" or "C-RAN system" 100. The baseband units 104 are also referred to here as "baseband controllers" 104 or just "controllers" 104. Each RP 106 includes or is coupled to at least one (e.g., two) antennas 108 via which downlink RF signals are radiated to user equipment (UE) 110 and via which uplink RF signals transmitted by UEs 110 are received. Each UE 110 may be a computing device with a processor that executes instructions stored in memory, e.g., a mobile phone, tablet computer, mobile media device, mobile gaming device, laptop computer, vehicle-based computer, a desktop computer, etc.

The eNB 100 is coupled to the core network 112 of each wireless network operator over an appropriate back-haul. In the exemplary configuration shown in FIG. 1, the Internet 114 is used for back-haul between the eNB 100 and each core network 112. However, it is to be understood that the back-haul can be implemented in other ways.

The exemplary configuration of the eNB 100 shown in FIG. 1 is described here as being implemented as a Long Term Evolution (LTE) radio access network providing wireless service using an LTE air interface. LTE is a standard developed by 3GPP standards organization. In this configuration, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology). The controller 104 may be located in a location that is physically remote from the RPs 106, e.g., in a centralized bank of controllers 104.

Also, in this exemplary LTE configuration, each core network 112 may be implemented as an Evolved Packet Core (EPC) 112 comprising standard LTE EPC network elements such as, for example, a mobility management entity (MME) (not shown) and a Serving Gateway (SGW) (not shown) and, optionally, a Home eNB gateway (HeNB GW) (not shown) and a Security Gateway (SeGW) (not shown).

Moreover, in this exemplary configuration, each controller 104 may communicate with the MME and SGW in the EPC core network 112 using the LTE S1 interface and communicates with other eNBs using the LTE X2 interface. For example, the controller 104 can communicate with an outdoor macro eNB (not shown) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary configuration shown in FIG. 1, the front-haul that communicatively couples each controller 104 to the one or more RPs 106 is implemented using a standard ETHERNET network 116. However, it is to be understood that the front-haul between the controllers 104 and RPs 106 can be implemented in other ways.

3GPP has adopted a layered model for the LTE radio access interface. Generally, the controller 104 and/or RPs 106 perform analog radio frequency (RF) functions for the air interface as well as digital Layer 1, Layer 2, and Layer 3 (of the 3GPP-defined LTE radio access interface protocol) functions for the air interface.

Digital baseband functions are referred to as Layer 1. Other radio access interface related protocol layers in the eNB are Medium Access Control (MAC), Radio Link Control (RLC), Packet Data Convergence Protocol (PDCP), and Radio Resource Control (RRC).

The LTE eNB 100 may also implement certain protocol layers related to EPC (Evolved Packet Core, described above) interface, including S1-AP and GTP.

Group of protocols pertaining to processing of user data (U-PLANE) (e.g., MAC, RLC and PDCP) are referred to as Layer 2 protocols in this document. Functions of the MAC layer may be closely related to Layer 1 and have hard real time constraints. Other protocols in Layer 2 (namely RLC, PDCP and GTP) do not have such real time constraint and are referred to as packet processing protocols in this document.

RRC and S1-AP are Control Plane (C-Plane) protocols and are also referred to as Layer 3 protocols.

In one example, each baseband controller 104 comprises Layer 3 (L3) functionality, Layer 2 (L2) functionality, and Layer 1 (L1) functionality configured to perform at least some of the L3 processing, L2 processing, and L1 processing, respectively, for the LTE air interface implemented by the eNB 100, and each RP 106 includes (optionally) L1 functionality that implements any L1 processing for the air interface that is not performed in the controller 104 and one or more radio frequency (RF) circuits that implement the RF front-end functions for the air interface and the one or more antennas 108 associated with that RP 106.

Other possible functional splits between the controller 104/RPs 106 of the L1-L3 processing for the air interface include: (1) all L1-L3 processing in controller 104; (2) all L2 and L3 processing in controller 104/all L1 processing in RPs 106; (3) all L3 and some L2 processing in controller 104/all L1 and some L2 processing in RPs 106; (4) all L3 processing in controller 104/all L1-L2 processing in RPs; (5) some L3 processing in controller 104/some L3 and all L1-L2 processing in the RPs 106. Preferably, all RF front-end processing for the air interface and the one or more antennas 108 is performed in the RPs 106, i.e., the controller 104 preferably does not perform any RF processing for the air interface or the antennas 108 (although other configurations are possible).

In some configurations (e.g., where all the L1-L3 processing is performed in the controller 104), IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116.

Where frequency-domain IQ data is front-hauled between the controllers 104 and the RPs 106, each baseband controller 104 can be configured to perform all or some of the digital L3, L2, and L1 processing for the air interface. In this case, the L1 functions in each RP 106 can be configured to implement the digital L1 processing for the air interface that is not performed in the controller 104. For example, in this exemplary configuration, each controller 104 may implement a receiver and a scheduler for the cell 103.

Where the front-haul ETHERNET network 116 is not able to deliver the data rate need to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

In the exemplary configuration shown in FIG. 1, a management system 118 is communicatively coupled to the controllers 104 and RPs 106, for example, via the Internet 114 and ETHERNET network 116 (in the case of the RPs 106).

In the exemplary configuration shown in FIG. 1, the management system 118 communicates with the various elements of the eNB 100 using the Internet 114 and the ETHERNET network 116. Also, in some implementations, the management system 118 sends and receives management communications to and from the controllers 104, each of which in turn forwards relevant management communications to and from the RPs 106.

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

Specifically, each controller 104 may include at least one processing engine (PE) 105, e.g., a processing resource configured to execute instructions stored in a memory to implement a specific functionality. For example, a processing engine may be one of multiple cores in a processor, e.g., a reduced instruction set computing (RISC), such as the Power Architecture e6500 family of processors. Each processing engine may include a packet processing module 107 that implement the non-real time packet processing layers in the eNB, e.g., GTP, PDCP and/or RLC-UL layers.

In some configurations, the controller 104 may include multiple processing engines (PEs) 105 that are employed to parallelize packet processing. Accordingly, a distributor/load balancer 134 may distribute traffic from UE 110 sessions among the available processing engines 105. The distributor/load balancer 134 may measure, distribute and balance the load on the processing engines 105. Specifically, the distributor/load balancer 134 may be configured to: (1) estimate the load on the processing engines; (2) assign one of the multiple processing engines 105 to each new UE 110 session (with the eNB) based on the current load conditions on the processing engines 105; (3) select UE(s) 110 for redirection (from one processing engine 105 to another); and/or (4) redirecting UE(s) 110 from one processing engine 105 to another, e.g., without disrupting packet processing order, delay, etc.

It should be noted that the terms UE(s), session(s), and UE session(s) are used interchangeably (in the context of assigning, distributing, moving, redirecting, and/or variants) to refer to flow(s) of packets between an eNB 100 and a UE 110, e.g., an LTE session.

Figure 2:
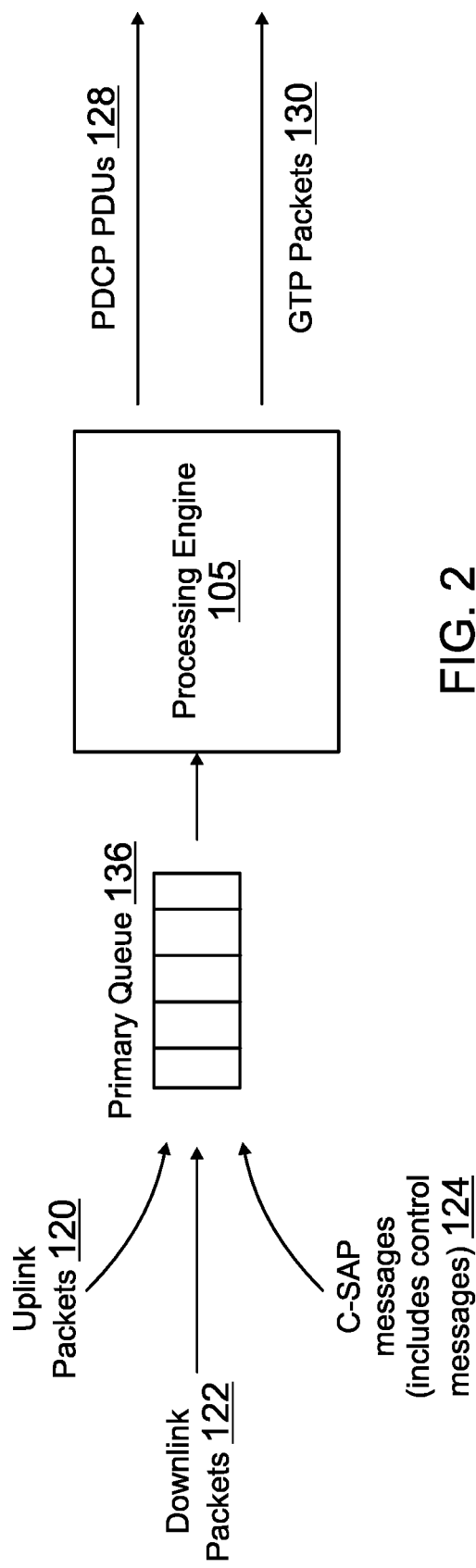
FIG. 2 is a block diagram illustrating the flow of input traffic into a processing engine.

FIG. 2 is a block diagram illustrating the flow of input traffic into a processing engine 105. The processing engine 105 may be implemented using at least one processor, e.g., the processing engine 105 may be one of multiple cores in a multi-core processor, such as a RISC.

As mentioned above, 3GPP has adopted a layered model for specifying LTE radio access interface. Lower layers like MAC (L2) and physical layer (L1) have functions (that influence the air transmission of radio frames) that are time synchronized. This introduces a real-time constraint on these layers, e.g., the MAC and physical layer functions need to complete the processing required for transmission within one-millisecond interval referred to as Transmit Time Interval (TTI).

However upper layers that deal with incoming and outgoing packets do not have such strict restrictions. Accordingly, GTP, PDCP and RLC-UL layers in the LTE eNB 100 are referred to herein as "non-real time" layers because they do not have hard bound like the MAC layer (or physical layer) to complete processing of a particular packet or frame. Even though they are non-real time layers, it is desirable for the processing (performed by the GTP, PDCP and RLC-UL layers) to complete quickly in order to avoid latency. Each of GTP, PDCP and RLC layers include uplink and downlink processing parts. RLC-downlink part is not included in the non-real time group due to certain real-time constraints on its processing that originates due to its interface with the MAC Scheduler. The packet processing engine 105 may implement the combined functionality of non-real time layers (GTP, PDCP and RLC-UL) in the LTE eNB 100.

The processing engine 105 (e.g., the packet processing module 107) may implement S1U (GTP), PDCP (Packet Data Convergence Protocol) and/or RLC functionality according to the 3GPP specifications, e.g., which may be similar to processing in IP-based systems that terminate UDP/TCP based stateful sessions. At a high level, it involves stateful manipulation of headers, fragmentation, reassembly and encapsulation/decapsulation functions. There are control plane interactions involved when the UE 110 goes through radio link failure (RLF) in the air interface. The processing engine 105 may interact with hardware accelerators to perform computation intensive cryptographic operations like encryption, decryption and integrity protection.

Specifically, the processing engine 105 (e.g., the packet processing module 107 in the processing engine 105) may receive three different types of input: uplink packets 120, downlink packets 122, and/or C-SAP packets/messages 124.

The uplink packets 120 may be input to the RLC-UL layer, e.g., the uplink packets may be (or include) MAC uplink data packets. The downlink packets 122 may be IP packets intended for transmission to a UE 110, e.g., IP packets encapsulated in GTP header. The C-SAP packets 124 may be instructions to the User Plane (U-Plane) layers from the RRC control plane protocol. The C-SAP packets 124 may include instructions to create and/or delete UE 110 contexts, add and/or delete data bearers to UEs 110, etc. The C-SAP packets 124 may also include control messages for RLC and PDCP layers.

The input traffic to the processing engine 105 may be composed of traffic from (and/or to) individual UEs 110 connected to the eNB 100. Data for individual UEs 110 may be composed of data from one or more bearers. For uplink packets 120 and C-SAP packets 124, individual bearers may be identified by the tuple (UE-ID, Bearer-ID). For downlink packets 122, each bearer may be identified by a unique tunnel/bearer identifier present in a GTP header. The UE state information (sometimes referred to as UE Context) may include the mapping between tunnel/bearer identifier and the (UE-ID, Bearer-ID) pair.

The different types of messages may be queued in a primary queue 136, e.g., a first-in-first-out (FIFO) queue. The processing engine 105 may remove messages from the queue and process them. This may include PDCP and/or RLC-UL processing. Uplink packets 120 may be subject to RLC-UL, PDCP, and/or GTP processing and the resultant GTP packet may be sent to an SGW (not shown). Downlink packets 122 may be subject to GTP and PDCP processing, and the resulting PDCP protocol data units (PDUs) may be sent to an RLC downlink processor (not shown).

Parallel Processing

Figure 3:
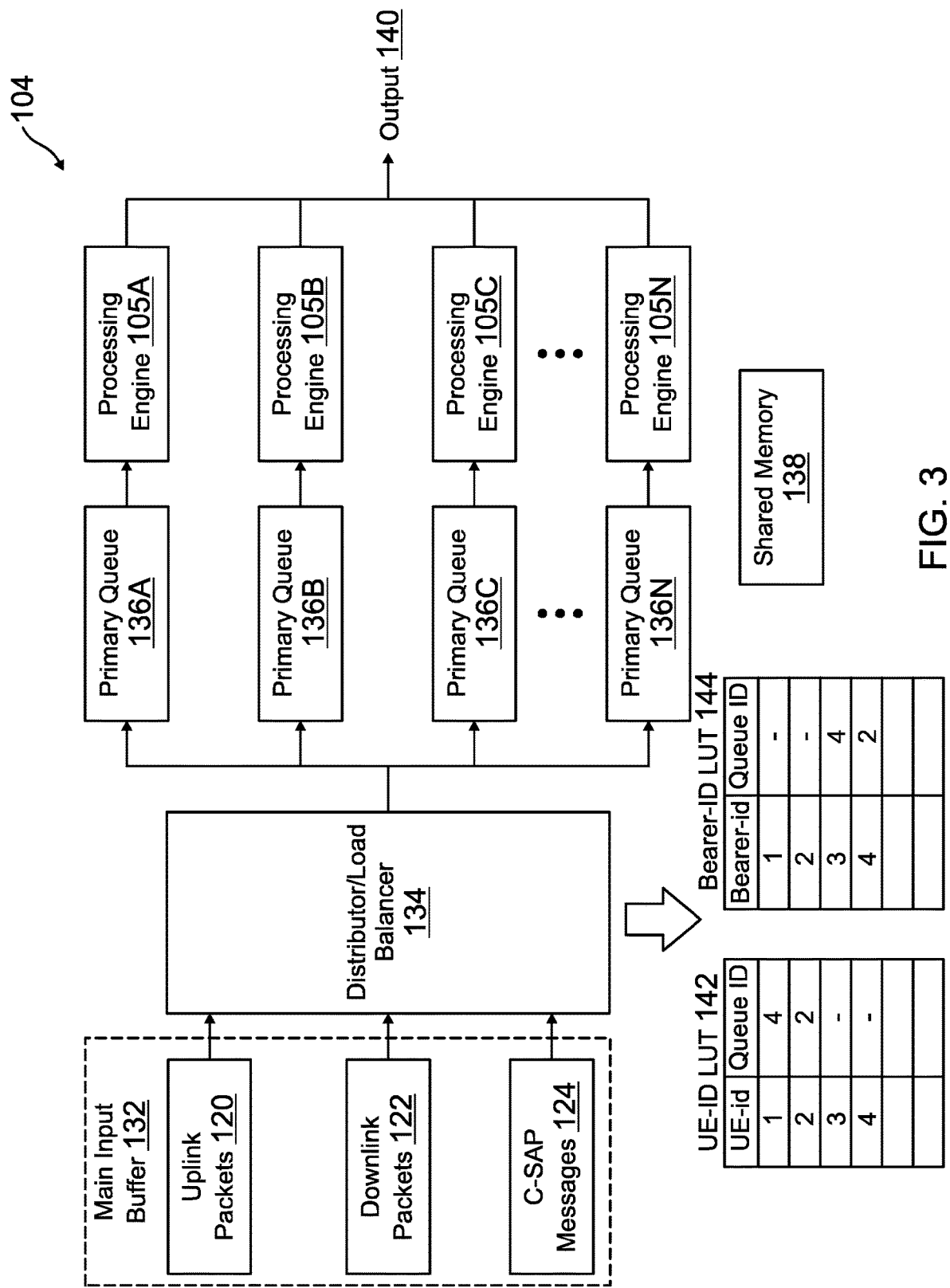
FIG. 3 is a block diagram illustrating parallel processing in an example LTE controller for packet processing.

FIG. 3 is a block diagram illustrating parallel processing in an example LTE controller 104 for packet processing. When the packet processing capacity required by a controller 104 is greater than the available capacity on any single processor, it may be desirable to use multiple processors for achieving the required throughput by distributing the work load (instead of switching to a more powerful processor).

Accordingly, the controller 104 in FIG. 3 may use parallel processing and distribution to meet increased packet processing requirements, e.g., multiple processing engines 105A-N. For example, each of the processing engines 105 may be a core in a multi-core processor.

Each type of input packet may be available in a main input buffer 132, e.g., uplink packets 120, downlink packets 122, and C-SAP packets 124. For example, the main input buffer 132 may include separate buffers for each of the uplink packets 120, downlink packets 122, and C-SAP packets 124. Alternatively, a single main input buffer 132 may store the uplink packets 120, downlink packets 122, and C-SAP packets 124.

The uplink packets 120, downlink packets 122, and C-SAP packets 124 may be removed from the main input buffer 132 by a distributor/load balancer 134 and queued in one of the four processing-engine-specific queues (i.e., the primary queues 136A-N) depending on which processing engine 105 that packet 120, 122, 124 is assigned to. The distributor/load balancer 134 may be implemented with one or more processors (or one or more cores of a multi-core processor) that execute instructions stored in memory, e.g., an ASIC, RISC, FPGA, DSP, ARM, etc.

Mapping of incoming packets to a destination PE 105 is stored in the lookup tables (LUTs) shown in FIG. 3. The processing engines 105 may pick up packets 120, 122, 124 from their respective primary queue 136A-N and process them using the state information stored in shared memory 138. Output 140 of the processing engines 105 is either stored in an output buffer from which another processor may remove it for transmission, or the output 140 may be transmitted synchronously from the processing engines 105.

The shared memory 138 may include UE 110 and bearer state information. In one configuration, the shared memory 138 may be accessible to all processing engines 105 and the distributor/load balancer 134. However, the distributor/load balancer 134 in the present systems and methods may not need complete access to the UE 110 context memory. For example, the distributor/load balancer 134 may only have access to a limited set of tables (e.g., the UE-ID LUT 142 and a Bearer-ID LUT 144) and a table containing UE 110 load information. The shared memory 138 may be indexed using UE-ID and Bearer-ID. The shared memory 138 may store all information and mappings needed for processing UEs 110 and their bearers, e.g., including the UE-ID LUT 142 and a Bearer-ID LUT 144.

To ensure correct and efficient processing, packets 120, 122, 124 from a given session may be sent to the same processing engine 105 and be processed sequentially. Processing of packets 120, 122, 124 of a given session may be done in a stateful manner in order to avoid situations where two different processing engines 105 are operating on packets 120, 122, 124 from the same session at the same time. Designing and implementing enhancements to the processing engines 105 (and/or the instructions executed by the processing engines 105) to be able to achieve parallelism at packet level may be expensive (in terms of labor, processing resources, etc.) and may reduce the overall performance of the system. Such design may also be inefficient from a cache-efficiency perspective. Instead, in the controller 104 in FIG. 3, packets 120, 122, 124 from a given UE 110 may be processed by only one processing engine 105 at any given time. This allows for easy reuse and migration of instructions from uniprocessor architectures to multi-processor architectures (to get higher performance) with addition of load distribution and balancing functions.

It should be noted that while four processing engines 105 (and primary queues 136) are illustrated in FIG. 3, the systems and methods described herein are applicable to any number of processing engines 105 (and supporting circuitry), i.e., any positive integer, preferably greater than one.

Traffic Distribution

An LTE eNB 105 typically supports between 500 and 4000 UE 110 sessions. The traffic from these sessions needs to be distributed to the available processing engines 105. As discussed above, the processing engines 105 may receive three types of input: uplink packets 120, downlink packets 122, and C-SAP packets 124. For downlink packets 122, a GTP Tunnel/Bearer ID (in each downlink packet 122) may be used for distribution. For uplink packets 120 and C-SAP packets 124, a UE-ID (in each uplink packet 120 and C-SAP packet 124) may be used for distribution.

Distribution may be performed based on lookup tables. There may be at least two lookup tables maintained in the system, one based on Bearer-ID (Bearer-ID LUT 144) and other based on UE-ID (UE-ID LUT 142). Each table 142, 144 stores the mapping from its respective key to target processing engine 105 and/or queue. Initially at the time of UE 110 session creation, the lookup table 142, 144 entries are created to establish the relationship between UE 110 session and one of the processing engines 105 and/or queue. A new UE 110 session may be assigned to a processing engine 105 based on the current load conditions on the processing engines 105.

Distributor/Load Balancer

The distributor/load balancer 134 in FIG. 3 may perform distribution (of input packets) and load balancing (among processing engines 105). Distribution and load balancing are related concepts in the sense that alterations in distribution is done to balance the load.

Distribution refers to transporting the input packets 120, 122, 124 from the main input buffer 132 to the primary queues 136. Distribution may be performed in a controlled manner in order to fill up the primary queues 136 in order to ensure that the processing engines 105 are continuously utilized. Optionally, bursts of packets 120, 122, 124 may be buffered before the distributor/load balancer 134 (rather than in the primary queues 136).

Load balancing refers to how the input packets 120, 122, 124 are assigned (or re-assigned) to particular processing engines 105, which creates the processing load at each processing engine 105. Load balancing may be invoked periodically or based on depth of the respective primary queues 136.

Load Balancing Strategy

Workload on a processing engine 105 is based on traffic from different UEs 110, each having varying number of bearers. The number and the type of bearers created for a UE 110 is dynamic and depends on the type and activity of the application running on the UE 110. At the time of initial session setup, the size, time duration, and burstiness of the data stream of individual UEs 110 may not be estimated. Therefore, adaptive mechanisms may be used to adjust the flow distribution dynamically to control load on individual processing engines 105.

Generally, there are two types of load imbalances on processing engine(s) 105: (1) short term/transient imbalance; and (2) long term imbalance. Short term/transient imbalances are short in duration, e.g., in the range of 10 to 500 milliseconds. These are due to large numbers of packets 120, 122, 124 arriving at the input of a processing engine 105 in a short period of time. Such bursts may be handled by providing adequate buffering (in terms of memory) and by allowing for certain over-provisioning (in terms of processing capacity available on the processing engine 105).

Long term imbalances may be longer in duration, e.g., longer than 500 milliseconds and may be predictable. Long term imbalances may be due to a very small number of UEs 110 generating a high volume of data for a relatively long period of time, e.g., more than few seconds. Adaptive load-balancing may be used to handle such scenarios. Long term imbalances may be common when a small number of large flows are in operation. For example, if one or more UEs 110 are capable of utilizing complete cell bandwidth.

Adaptive Load Balancing may include two parts: First, a processing engine 105 may be assigned to a newly-created UE 110 session. One possible way to make this initial assignment is to assign the new (i.e., previously unassigned) UE 110 session to the least loaded processing engine 105. However, during high turnover of (incoming and outgoing) UE 110 sessions, considering both the session load and processing load (while determining the least loaded processing engine 105) may be more effective to ensure load balance.

Second, adaptive load balancing may include UE 110 redirection in response to overload detection. In the absence of incoming and outgoing UE 110 sessions or in case the imbalance (among processing engines 105) persists in spite of load balancing done at session creation time, flows may be adaptively redirected from overloaded processing engines 105 to a least loaded processing engine 105. In order to maximize the effectiveness of redirection, one or more of the following factors may be considered while choosing UEs 110 and processing engines 105 for redirection: (1) the extent of overload and/or load on processing engines 105; (2) the size of the high-volume flows causing overload; (3) the extent of contribution of high-volume flows to the processing engines 105; and/or (4) the available processing resources in other processing engines 105 in the controller 104.

The load balancing performed by the distributor/load balancer 134 may account for one or more of factors (1)-(4) in order to identify the most optimal combination of UE 110 and target processing engine 105 for redirection. Specifically, the distributor/load balancer 134 may (1) estimate the total load on a processing engine 105 (as a percentage of CPU occupancy) based on the packet rate being handled by the processing engine 105; and (2) estimate the load on the processing engine 105 due to each UE 110 based on the packet rate being generated by each UE 110. These two different types of estimates may allow the distributor/load balancer 134 to express total load on a particular processing engine 105 in terms of load on the processing engine 105 due to individual UEs 110. Representing the processing load on the processing engine 105 in this way enables the distributor/load balancer 134 to make the most efficient load balancing decisions, e.g., assigning (or re-directing) UE 110 sessions to processing engines 105 in the most efficient way possible.

The packet processing rate of a processing engine 105 may be a simple way to estimate load on the processing engines 105. Specifically, the load on the processing engine 105 may increase with processing rate. However, it may be impractical or impossible to directly relate the packet rate to processor load when different types of packets are involved (since the extent of load caused by a packet depends on its type). For a given packet type (e.g., uplink packet 120, downlink packet 122, or C-SAP packet 124), the relationship between load and packet rate is almost linear. By suitably combining the rate of different types of packets (as described below), we can accurately express the load on a processing engine 105 in terms of combined packet rate (packets processed per unit time). Advantages of estimating load on a processing engine 105 this way is that (1) packet counts can be obtained with minimal overhead in most systems, which usually determine packet counts as part of Operational Measurements; and (2) it provides means to represent the total load on the processing engine 105 as a sum of loads contributed by individual UEs 110. This may be useful for taking effective load balancing decisions, especially when a particular UE 110 session needs to be redirected from an overloaded processing engine 105, to a lesser loaded processing engine 105.

Processing Engine Load Estimation

Figure 4:
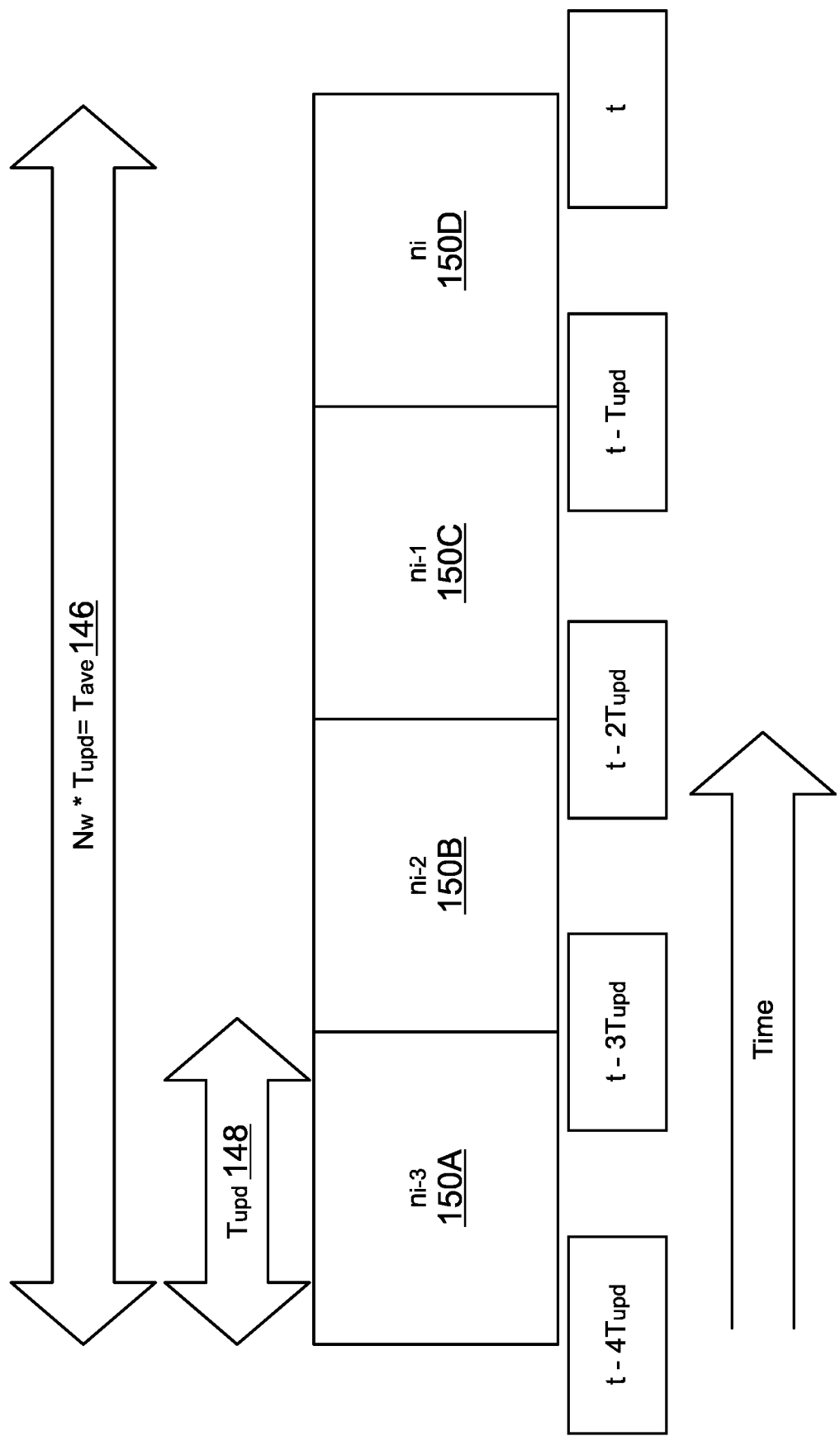
FIG. 4 is a block diagram illustrating a method for determining an average packet rate of a packet stream.

FIG. 4 is a block diagram illustrating a method for determining an average packet rate of a packet stream. The terms "CPU load", "CPU processing load," "processing load," "computational load," "PE load," "processing engine load," or simply "load" (and their variants) may be used interchangeably herein to refer to any metric characterizing an amount of processing resources being consumed in a particular processing engine 105 or other processing device, e.g., in absolute terms, in terms of percentage of CPU occupancy, packet processing rate, etc. Furthermore, the term "session load" is used herein to refer to a number of sessions being processed.

Aggregate and per-UE packet counts and rate are common measurements done in many systems. In the packet processing module 107, processing load may be, at least partially, a function of header processing (but typically is not affected by much packet length). Hence the estimation method of processing engine 105 load should preferably incorporate the variations due to different packet types, e.g., uplink packet 120, downlink packet 122, or C-SAP packet 124. In some configurations, the aggregate packet rate for each type of packet at the system level and at a per-UE level may be tracked. To simplify selection load balancing related computation, it may be useful to express processing engine 105 load in terms of packet rate of one single type. Using simulated traffic, it is possible to normalize the load from different packet types and express the load in terms of only one type. In some configurations, downlink packets 122 may be chosen as the standard type, and packet rates from other types may be represented in terms of downlink packet 122 rate. Thus, processing engine 105 load may be expressed in terms of one type of packet, e.g., in terms of downlink packet 122 rate.

The downlink packet 122 rate ($R_{dl}$) may be calculated using a sliding window procedure. Specifically, $R_{dl}$ may be the downlink packet 122 rate expressed as packets per TTI (Transmit Time Interval, e.g., 1 ms). The averaging duration over which the downlink packet 122 rate ($R_{dl}$) is calculated may have the following parameters: $T_{upd}$ 148, $N_w$, and $T_{ave}$ 146. $T_{upd}$ 148 may be the update duration (e.g., expressed in units of 1 ms), which may be configurable in the controller 104. In some configurations, the downlink packet 122 rate ($R_{dl}$) may be updated once per $T_{upd}$ 148. $N_w$ may be the window size (shown as four in FIG. 4), and may be configurable in the controller 104. $T_{ave}$ 146 may be the averaging duration, e.g., $T_{ave} = N_w * T_{upd}$.

With reference to FIG. 4, each location in the window may stores a count ($n_i$) 150A-D of the number of packets received during corresponding $T_{upd}$ time interval 148, e.g., each n 150 may be the number of downlink packets 122 received at a processing engine 105 during a respective period of time, $T_{upd}$ 148. The aggregate count of packets received during the interval ($T_{ave} = N_w * T_{upd}$ time units) may be used to calculate the downlink packet 122 rate, e.g., the counts ($n_i$) 150 per $T_{upd}$ time interval 148 may be summed to determine the aggregate count across $T_{ave}$ 146. The counts ($n_i$) 150 may be stored in a sliding circular buffer of size $N_w$ (where the oldest entry is overwritten on expiry of every $T_{upd}$ period 148).

After each update interval i, the downlink packet 122 rate ($R_{dl}$) may be calculated according to Equation (1):

$$R_{dl} = \frac{1}{T_{avg}} \sum_{j=0}^{N_w-1} n_{i-j} \quad (1)$$

Similarly, uplink packet 120 rate may be calculated, after each update interval i, according to Equation (2):

$$R_{ul} = \frac{1}{T_{avg}} \sum_{j=0}^{N_w-1} n_{i-j} \quad (2)$$

where $R_{ul}$ is the uplink packet 120 rate expressed as packets per TTI (e.g., 1 ms) and $n_i$ is the number of packets received during the ith $T_{upd}$ time interval 148, e.g., for Equation (2), each n 150 is the number of uplink packets 120 received at a processing engine 105 during a respective period of time, $T_{upd}$ 148.

Similarly, C-SAP packet 124 rate may be calculated, after each update interval i, according to Equation (3):

$$R_{C\text{-}SAP} = \frac{1}{T_{avg}} \sum_{j=0}^{N_w-1} n_{i-j} \quad (3)$$

where $R_{C\text{-}SAP}$ is the C-SAP packet 124 rate expressed as packets per TTI (e.g., 1 ms) and $n_i$ is the number of packets received during the ith $T_{upd}$ time interval 148, e.g., for Equation (3), each n 150 is the number of C-SAP packets 124 received at a processing engine 105 during a respective period of time, $T_{upd}$ 148.

Normalized Packet Rate

To simplify the processing engine 105 selection procedure for load balancing, different types of packet rates (e.g., $R_{dl}$, $R_{ul}$, $R_{C\text{-}SAP}$) may be normalized into a single standard type. For example, if the downlink packet 122 rate ($R_{dl}$) were selected as the standard, the uplink packet 120 rate ($R_{ul}$) and the C-SAP packet 124 rate ($R_{C\text{-}SAP}$) may be expressed in terms of the downlink packet 122 rate ($R_{dl}$) based on their respective equivalence relationship. The relationship between the standard packet type rate (e.g., the downlink packet 122 rate ($R_{dl}$)) and the packet type rate for a specific type (e.g., the uplink packet 120 rate ($R_{ul}$) and the C-SAP packet 124 rate ($R_{C\text{-}SAP}$)) may be determined by profiling the CPU utilization in simulated traffic conditions with the different packet types. The following example tables are populated for each packet type.

The relationship between the CPU load and downlink packet 122 rate can be characterized according to Equation (4):

$$CPU \text{ Load Percentage (downlink packets)} = \frac{R_{dl}}{X} \quad (4)$$

where X is a ratio of downlink packet 122 rate to CPU load (e.g., as a percentage of PE 105). For example, the relationship between CPU load and downlink packet 122 rate based on example Table 1 below, may be $R_{dl}/750$ (since 75000/100=750):

TABLE 1

CPU Load & Downlink Packet Rate ($R_{dl}$)

| CPU Load Percentage of PE | Downlink Packet Rate (with UL and C-SAP packet rates set to 0) |
|---|---|
| 100 | 75000 |
| 90 | 67000 |
| 80 | 60200 |
| 70 | 52400 |
| 60 | 45000 |
| 50 | 37600 |
| 40 | 30500 |
| 30 | 22400 |
| 20 | 14900 |
| 10 | 7500 |
| 2 | 0 |

Small CPU Loads (under no load condition) may be ignored, e.g., CPU Load Percentage of "2" in Table 1 may not be captured in Equation (4), but this omission will have negligible effect.

Similarly, the relationship between CPU load and uplink packet 120 rate (from Table 2) can be characterized according to Equation (5):

$$CPU \text{ Load Percentage (uplink packets)} = \frac{R_{ul}}{Y} \quad (5)$$

where Y is a ratio of uplink packet 120 rate to CPU load (e.g., as a percentage of PE 105). For example, the relationship of CPU load and uplink packet 120 rate based on example Table 1 below, may be $R_{ul}/267$ (since 26700/100=267):

TABLE 2

CPU Load & Uplink Packet Rate ($R_{ul}$)

| CPU Load Percentage of PE | Uplink Packet Rate (with DL and C-SAP packet rates set to 0) |
|---|---|
| 100 | 26700 |
| 90 | 24000 |
| 80 | 21360 |
| 70 | 18680 |
| 60 | 16030 |
| 50 | 13360 |
| 40 | 10670 |
| 30 | 8030 |
| 20 | 5330 |
| 10 | 2650 |
| 2 | 0 |

Furthermore, the conversion factor between downlink packet 122 rate and uplink packet 120 rate may be characterized by Equation (6):

$$R_{dl}(\text{Equivalent}) = \frac{R_{ul} * X}{Y} \quad (6)$$

To measure the CPU load as a function of the C-SAP packet 124 rate, tests that generate only C-SAP packets 124 (without any uplink packets 120 or downlink packets 122) may not be available. However, the CPU load due to these messages may be estimated by introducing time stamps in the code that handles these C-SAP packets 124 (and other control messages). With these timestamps the exclusive contribution to CPU load from C-SAP packets 124 may be measured, assuming there are enough points to capture the trend.

Accordingly, the relationship between CPU load and C-SAP packet 124 rate (from Table 3) can be characterized according to Equation (7):

$$CPU \text{ Load Percentage } (C\text{-}SAP \text{ packets}) = \frac{R_{C\text{-}SAP}}{Y} \quad (7)$$

where Z is a ratio of C-SAP packet/message 124 rate to CPU load (e.g., as a percentage of PE 105). For example, the relationship of CPU load and C-SAP packet 124 rate based on example Table 3 below, may be $R_{C\text{-}SAP}/135$ (since 5350/40≈135):

TABLE 3

CPU Load & C-SAP packet Rate ($R_{C\text{-}SAP}$)

| CPU Load Percentage of PE | C-SAP packet Rate (with DL and C-SAP packet rates set to 0) |
|---|---|
| 40 | 5350 |
| 30 | 4100 |
| 20 | 2650 |
| 10 | 1350 |
| 2 | 0 |

Furthermore, the conversion factor between downlink packet 122 rate and C-SAP packet 124 rate may be characterized by Equation (8):

$$R_{dl}(\text{Equivalent}) = \frac{R_{C\text{-}SAP} * X}{Z} \quad (8)$$

Based on Tables 1-3 (and Equations (4)-(8)), the equivalence relationship between downlink packets 122 and other types of packets may be established as follows. The conversion factor for uplink packet 120 rate to downlink packet 122 rate may be 750/267 (or more generally, X/Y). Similarly, the conversion factor for C-SAP packet 124 rate to downlink packet 122 rate may be 750/135 (or more generally, X/Z).

With these conversion factors, the aggregate load on a processing engine 105 may be characterized in terms of only the downlink packet 122 rate. For example, when the uplink packet 120 rate=13360 packets/second; downlink packet 122 rate=14900 packets/second; and C-SAP packet 124 rate=1350 packets/second; the Equivalent aggregate downlink packet 122 rate=14900+13360*750/267+1350*750/135=59928. Or, more generally, according to Equation (9):

$$\text{Equivalent aggregate downlink packet 122 rate} = \quad (9)$$
$$R_{dl} + R_{ul} * \frac{X}{Y} + R_{C\text{-}SAP} * \frac{X}{Z}$$

In other words, Equivalent downlink packet rate=(downlink packet rate ($R_{dl}$))+(uplink packet rate ($R_{ul}$))*(uplink conversion factor)+(C-SAP packet rate ($R_{C\text{-}SAP}$))*(C-SAP conversion factor).

An aggregate load percentage may be determined by dividing the Equivalent aggregate downlink packet 122 rate by the maximum downlink packet 122 rate and multiplying by 100. The processing load percentage may be calculated by computing the ratio of total packet rate expressed in the downlink packet 122 rate and dividing it by the maximum supported downlink packet 122 rate (the downlink packet rate that corresponds to 100% CPU utilization), as in Equation (10):

$$\text{CPU Load \%} = \quad (10)$$
$$\frac{\text{Aggregate Packet rate Expressed as } DL \text{ packet rate}}{\text{Max } DL \text{ packet rate supported by processing engine}} * 100$$

In the example above, the processing engine 105 load percentage may be (59928/75000)*100=80%. The aggregate load for a processing engine 105 may be updated every $T_{upd}$ 148. Using the maximum downlink packet 122 rate from Equation (4), the CPU load percentage may be given in Equation (11):

$$\text{CPU Load \%} = \quad (11)$$
$$\frac{\text{Aggregate Packet rate Expressed as } DL \text{ packet rate}}{X} * 100$$

Using a similar procedure, the contribution of each UE 110 to CPU load may be calculated and maintained per UE 110, as in Equation (12):

$$\text{CPU Load Contribution from } UE_i = \quad (12)$$
$$\text{Aggregate Packet rate due to } UE_i$$
$$\frac{\text{Expressed as } DL \text{ packet rate}}{\text{Maximum } DL \text{ Packet rate supported by } PE} * 100$$

It should be noted that even though only three types of packet types (e.g., uplink packets 120, downlink packets 122, and C-SAP packets 124) are discussed herein, other configurations are possible, e.g., using more, fewer, and/or other types of packets. If the type of packets are more granularly differentiated to identify more variations in packet types (e.g., subsets of packet types), the CPU loading trend for each type (e.g., subtype) of packet may be determined, and the level of accuracy of CPU Load estimation may be improved further. Based on this, the contribution of individual UE Sessions to overall load on the processor may be estimated, which may be used to make load balancing decisions.

Figure 5A:
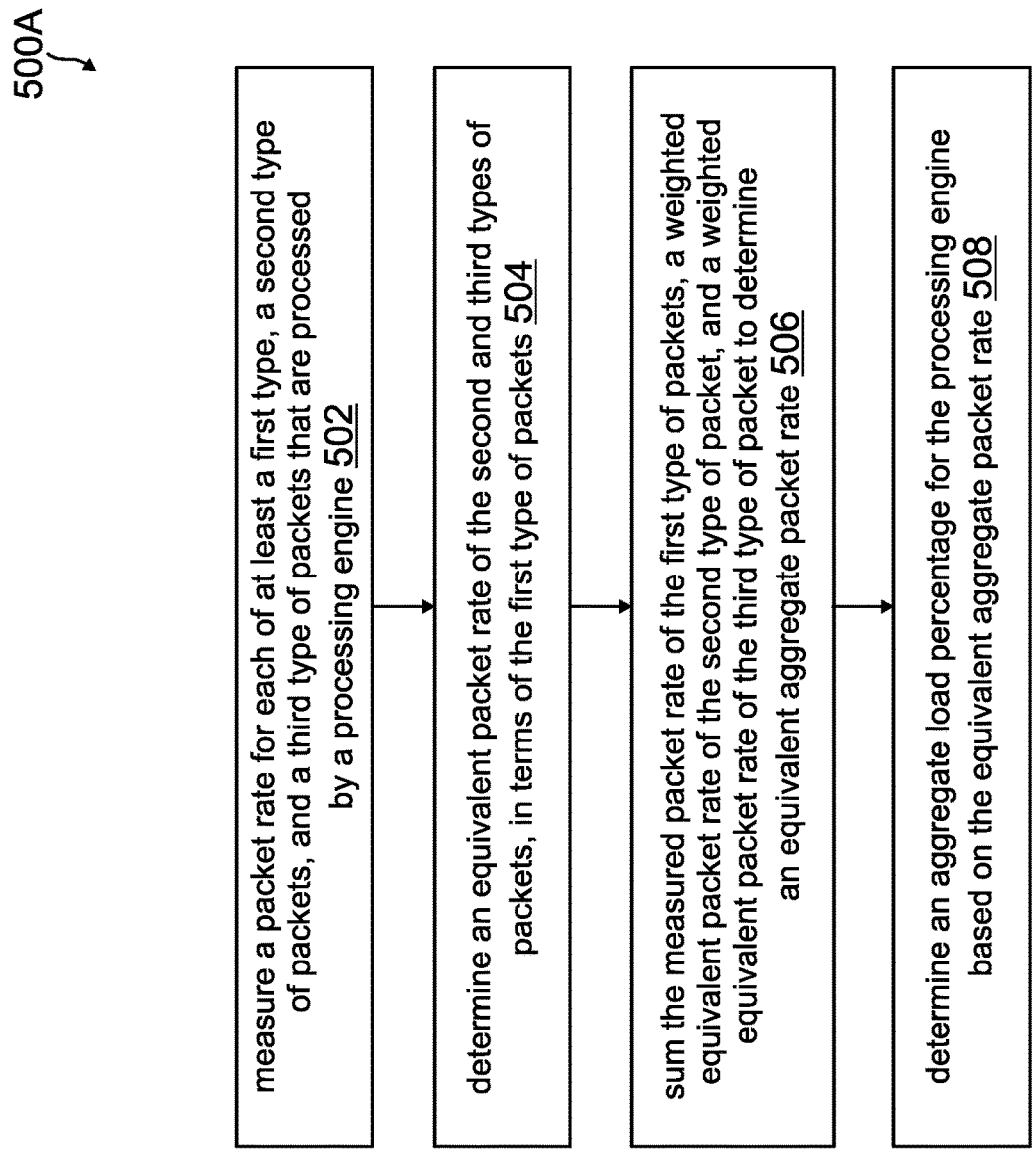
FIG. 5A is a flow diagram illustrating an exemplary method for estimating the load on a processing engine.

FIG. 5A is a flow diagram illustrating an exemplary method 500A for estimating the load on a processing engine 105. The method 500A may be performed by a controller 104 (e.g., a distributor/load-balancer 134 in a controller 104) that executes instructions stored in a memory or a programmable device (e.g., FPGA or dedicated hardware, such as an ASIC). Additionally, the method 500A may be performed iteratively for more than one (e.g., all) processing engines 105 in a controller 104. For example, the method 500A may be performed for each to determine a least loaded PE 105, a highest loaded PE 105, and/or a processing load differential between the least loaded PE 105 and the highest loaded PE 105.

The blocks of the flow diagram shown in FIG. 5A have been arranged in a generally sequential manner for ease of explanation; however, it is to be understood that this arrangement is merely exemplary, and it should be recognized that the processing associated with method 500A (and the blocks shown in FIG. 5A) can occur in a different order (for example, where at least some of the processing associated with the blocks is performed in parallel and/or in an event-driven manner). Also, most standard exception handling is not described for ease of explanation; however, it is to be understood that method 500A can and typically would include such exception handling.

The controller 104 may be configured to measure 502 a packet rate for each of at least a first type, a second type of packets, and a third type of packets that are processed by a processing engine 105. The term "packet rate" refers to the number of packets that are processed per unit time. In the examples herein, the "first type," "second type," and "third type" of packets may be downlink packets 122, uplink packets 120, and C-SAP packets/messages 124, respectively.

For example, if three types of input packets (uplink packets 120, downlink packets 122, and C-SAP packets/messages 124) are processed, the controller 104 may measure (e.g., every $T_{upd}$ 148): (1) the downlink packet 122 rate ($R_{dl}$) expressed as packets per TTI (e.g., 1 ms), e.g., according to Equation (1); (2) the uplink packet 120 rate ($R_{ul}$) expressed as packets per TTI, e.g., according to Equation (2); and (3) the C-SAP packet/message 124 rate (RC-SAP) expressed as packets per TTI, e.g., according to Equation (3).

The controller 104 may also be configured with a predetermined ratio (X) of downlink packet 122 rate to CPU load (e.g., as a percentage of PE 105), a predetermined ratio (Y) of uplink packet 120 rate to CPU load (e.g., as a percentage of PE 105), and a predetermined ratio (Z) of C-SAP packet/message 124 rate to CPU load (e.g., as a percentage of PE 105). X, Y and Z may be derived from measurements and/or simulations, and may be used to calculate the equivalent downlink packet rates of uplink packets 120 and C-SAP messages 124 according to Equations (6) and (8). In one configuration, values of X, Y, and Z may only be determined once (e.g., in laboratory conditions) and the determined values will not change unless there is a change in the software or hardware being used. X, Y, and Z may be determined using Equations (4), (5), and (7), respectively.

The controller 104 may also be configured to determine 504 an equivalent packet rate of the second and third types of packets, in terms of the first type of packets. Specifically, the equivalent packet rates for the second and third types of packets may be determined based on the measured packet rates of the second and third types of packets, respectively, e.g., determining $R_{dl}$(Equivalent) using Equations (6) and (8). For example, the controller 104 may also be configured to determine the equivalent downlink packet 122 rates of uplink packets 120 and C-SAP messages 124, e.g., according to Equations (6) and (8).

The controller 104 may also be configured to sum 506 the measured packet rate of the first type of packets, a weighted equivalent packet rate of the second type of packet, and a weighted equivalent packet rate of the third type of packet to determine an equivalent aggregate packet rate, e.g., determining the aggregate downlink packet 122 rate according to Equation (9).

The controller 104 may also be configured to determine 508 an aggregate load percentage for the processing engine 105 based on the equivalent aggregate packet rate. The aggregate load percentage for the processing engine 105 may also be determined based on the maximum packet rate for the first type of packets in the processing engine 105 (if Equation (10) is used) or X (if Equation (11) is used).

Figure 5B:
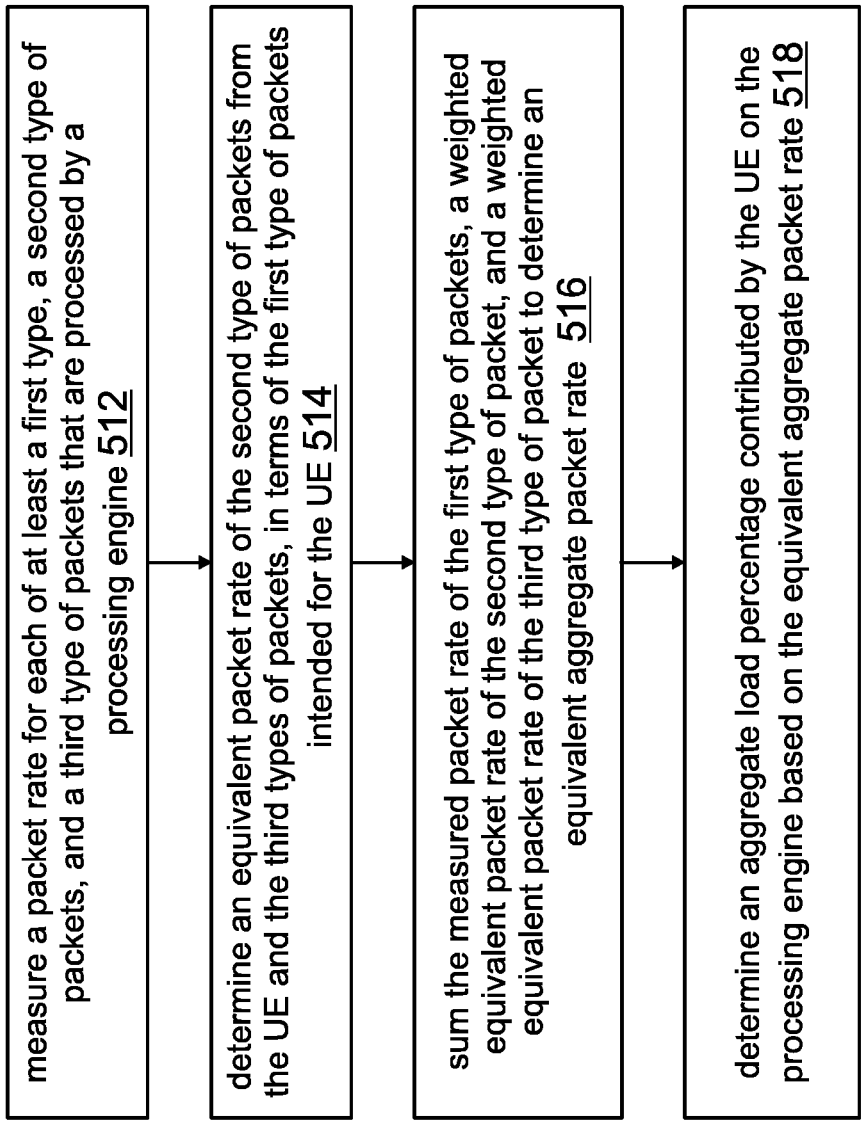
FIG. 5B is a flow diagram illustrating an exemplary method for estimating the load on a processing engine per UE.

FIG. 5B is a flow diagram illustrating an exemplary method 500A for estimating the load on a processing engine 105 per UE 110. The method 500B may be performed by a controller 104 (e.g., a distributor/load-balancer 134 in a controller 104) that executes instructions stored in a memory or a programmable device (e.g., FPGA or dedicated hardware, such as an ASIC). The method 500B illustrated in FIG. 5B may be similar to the method 500A illustrated, but performed for a particular UE 100. Additionally, the method 500B may be performed iteratively for more than one UE 100. In one configuration, a UE 110 is only associated with a single processing engine 105 at a time.

The blocks of the flow diagram shown in FIG. 5B have been arranged in a generally sequential manner for ease of explanation; however, it is to be understood that this arrangement is merely exemplary, and it should be recognized that the processing associated with method 500B (and the blocks shown in FIG. 5B) can occur in a different order (for example, where at least some of the processing associated with the blocks is performed in parallel and/or in an event-driven manner). Also, most standard exception handling is not described for ease of explanation; however, it is to be understood that method 500B can and typically would include such exception handling.

The controller 104 may be configured to measure 512 a packet rate for each of at least a first type intended for a UE 110, a second type of packets from the UE 110, and a third type of packets that are processed by a processing engine 105. The term "packet rate" refers to the number of packets that are processed per unit time. In the examples herein, the "first type," "second type," and "third type" of packets may be downlink packets 122, uplink packets 120, and C-SAP packets/messages 124, respectively.

For example, if three types of input packets (uplink packets 120, downlink packets 122, and C-SAP packets/messages 124) are processed, the controller 104 may measure (e.g., every $T_{upd}$ 148): (1) the downlink packet 122 rate ($R_{dl}$) expressed as packets per TTI (e.g., 1 ms), e.g., according to Equation (1); (2) the uplink packet 120 rate ($R_{ul}$) expressed as packets per TTI, e.g., according to Equation (2); and (3) the C-SAP packet/message 124 rate ($R_{C-SAP}$) expressed as packets per TTI, e.g., according to Equation (3).

The controller 104 may also be configured with a predetermined ratio (X) of downlink packet 122 rate to CPU load (e.g., as a percentage of PE 105), a predetermined ratio (Y) of uplink packet 120 rate to CPU load (e.g., as a percentage of PE 105), and a predetermined ratio (Z) of C-SAP packet/message 124 rate to CPU load (e.g., as a percentage of PE 105). X, Y and Z may be derived from measurements and/or simulations, and may be used to calculate the equivalent downlink packet rates of uplink packets 120 and C-SAP messages 124 according to Equations (6) and (8). In one configuration, values of X, Y, and Z may only be determined once (e.g., in laboratory conditions) and the determined values will not change unless there is change in used software or hardware. X, Y, and Z may be determined using Equations (4), (5), and (7), respectively.

The controller 104 may also be configured to determine 514 an equivalent packet rate of the second type of packets from the UE 110 and the third types of packets, in terms of the first type of packets intended for the UE 110. Specifically, the equivalent packet rates for the second and third types of packets may be determined based on the measured packet rates of the second and third types of packets, respectively, e.g., determining $R_{dl}$(Equivalent) using Equations (6) and (8). For example, the controller 104 may also be configured to determine the equivalent downlink packet 122 rates of uplink packets 120 and C-SAP messages 124, e.g., according to Equations (6) and (8).

The controller 104 may also be configured to sum 516 the measured packet rate of the first type of packets intended for the UE 110, a weighted equivalent packet rate of the second type of packet from the UE 110, and a weighted equivalent packet rate of the third type of packet to determine an equivalent aggregate packet rate, e.g., determining the aggregate downlink packet 122 rate according to Equation (9).

The controller 104 may also be configured to determine 518 an aggregate load percentage caused by the UE 110 on the processing engine 105 based on the equivalent aggregate packet rate. The aggregate load percentage caused by the UE 110 may also be determined based on the maximum packet rate for the first type of packets (intended for the UE 110) in the processing engine 105 (if Equation (10) is used) or X (if Equation (11) is used).

Initial Assignment of Processing Engine to UE at the Time of Session Creation

At the time of UE 110 session creation, a particular processing engine 105 may be assigned to process packets (e.g., uplink packets 120, downlink packets 122, and/or C-SAP packets) transmitted on (or otherwise relating to) the newly-created session. Assigning an appropriate processing engine 105 to the new session may be useful for load balancing. Traditional parallel processing systems may assign based on processing engine 105 loads, e.g., the least loaded processing engine 105 may be chosen. However, such conventional assignment does not differentiate between both session load (e.g., number of sessions hosted on each processing engine 105) and processing load on the processing engine 105.

In contrast, the controller 104 (e.g., the distributor/load balancer 134) may combine the number of sessions (processed by a processing engine 105) and the processing load on the processing engine 105 when initially assigning a processing engine 105 to a UE 110 session. This way, any load imbalance among different processing engines 105 can be more effectively controlled, e.g., instances where UEs 110 need to be redirected from one PE 105 to another for the purpose of load balancing will be reduced.

Incoming traffic to a controller 104, from a collection of UEs 110 with different traffic properties, may vary in terms of size and longevity of sessions. For scenarios with many UEs 110 having similar properties, distributing the UEs 110 on different processing engines 105, as described herein, may cause each processing engine 105 to handle a scaled down version of the aggregate incoming traffic.

However, in contrast to conventional techniques for initial session assignment, the controller 104 may account for both session load (e.g., the number of sessions processed by a processing engine 105) and packet load (e.g., the packet processing load on the processing engine 105) when initially assigning a processing engine 105 to the UE 110. For scenarios with a healthy session turnaround rate (e.g., a robust number of incoming and outgoing sessions in a given time interval), the initial assignment described herein may effectively maintain load balance among processing engines 105.

The following counts and parameters may be referred to when describing initial processing engine 105 assignment:
SCounti—the number of sessions hosted on processing engine i (PEi) 105;
PELoadi—the CPU load on PEi 105 calculated as described above.

As described above, the load values of all the processing engines 105 may be updated every Tupd interval 148. Additionally, the following parameters may be used when initially assigning a processing engine 105 to a UE 110 at the time of session creation:
LeastCPULoadPEIndex—index of the PE 105 that has the lowest load from CPU processing perspective; and
LeastSessionLoadPEIndex—index of the PE 105 that has lowest session load.
CPULoadDiff—the difference between the CPU Loads of least loaded PE 105 and highest loaded PE 105;
CPULoadDifferenceThreshold—configurable threshold, e.g., set to 40% by default;
CPULoadDifferenceTimeThreshold—configurable threshold, e.g., set to 2 seconds by default;
LoadAssignmentState—set to "Session" or "Load" at run time, e.g., set to session by default. If the CPULoadDiff is greater than CPULoadDifferenceThreshold for CPULoadDifferenceTimeThreshold seconds, LoadAssignmentState will be set to "Load", otherwise, LoadAssignmentState is set to "Session".

The initial assignment may be performed by the distributor/load balancer 134 (or another module on the controller 104). During initial PE 105 assignment, the distributor/load balancer 134 may attempt to keep the number of sessions balanced across the PEs 105 when there is no significant processing load differential on the processing engines 105. This may be done by assigning the PE 105 currently processing packets for the least/fewest number of sessions to the incoming new session. This initial assignment of new sessions to PE 105 may optimize most scenarios with a large number of sessions having similar properties.

However, as noted above, load imbalance may arise due to long-lived large packet flows from certain UEs 110. When such packet flows arise in the controller 104, a processing load difference may develop. In response to detecting such a differential, the distributor/load balancer 134 may instead use processing load (of each processing engine 105) instead of session load when determining the least loaded PE 105 to be assigned to the incoming new session.

The configurable parameters CPULoadDifferenceThreshold and CPULoadDifferenceTimeThreshold may be used to change the mode of initial session assignment from "Session" (e.g., based on which PE 105 is currently processing packets for the least number of sessions) to "Load" based on whether CPULoadDiff is greater than CPULoadDifferenceThreshold for CPULoadDifferenceTimeThreshold. The LoadAssignmentState is set to "Session" or "Load" based on this comparison. This state may be updated every $T_{upd}$ 148 when PE 105 loads are updated.

To summarize, new sessions may be assigned to the least loaded PE 105 in the controller 104. The least loaded PE 105 may be identified using either session load or processing load, e.g., depending on whether LoadAssignmentState is "Session" or "Load". The controller 104 may stay in the "Load" LoadAssignmentState as long as the processing load differential between least and highest loaded PEs 105 (e.g., CPULoadDiff) is greater than the set threshold (e.g., CPULoadDifferenceTimeThreshold).

Figure 6:
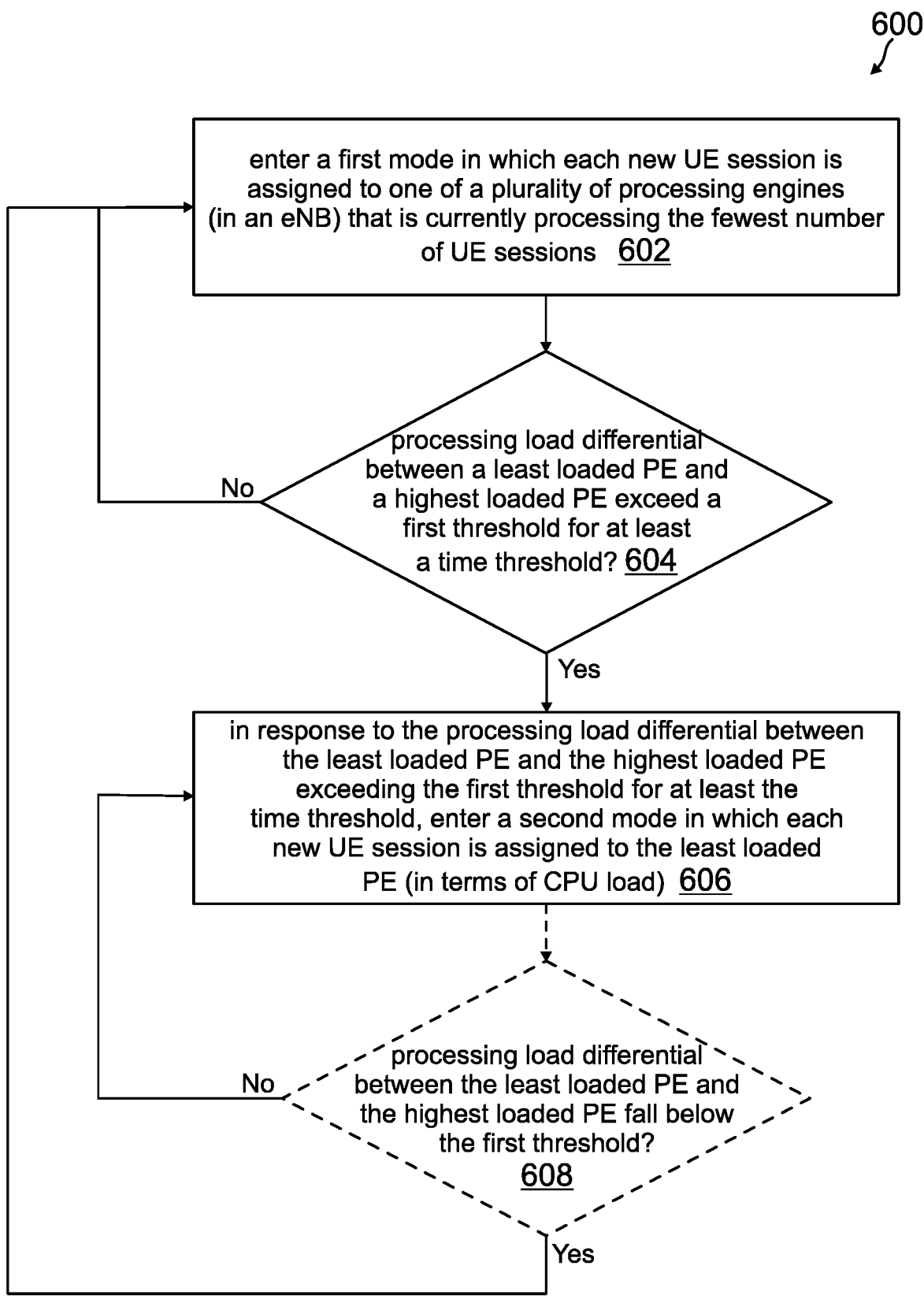
FIG. 6 is a flow diagram illustrating an exemplary method for initial assignment of a processing engine to a UE at the time of session creation.

FIG. 6 is a flow diagram illustrating an exemplary method 600 for initial assignment of a processing engine 105 to a UE 110 at the time of session creation. In other words, the method 600 may assign a particular processing engine 105 to process packets (e.g., uplink packets 120, downlink packets 122, and/or C-SAP packets) transmitted on (or otherwise relating to) a newly-created UE 110 session. The method 600 may be performed by a controller 104 (e.g., a distributor/load-balancer 134 in a controller 104) that executes instructions stored in a memory or a programmable device (e.g., FPGA or dedicated hardware, such as an ASIC).

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

The controller 104 may be configured to enter 602 a first mode in which each new (i.e., previously unassigned) UE 110 session is assigned to one of a plurality of processing engines 105 (in the controller 104) that is currently processing the fewest/least number of UE 110 sessions. For example, the controller 104 may enter the "Session" LoadAssignmentState to initially assign processing engines 105 to UE 110 sessions based on the number of sessions being processed by each processing engine 105.

The controller 104 may also be configured to determine 604 whether a processing load differential between a least loaded PE 105 and a highest loaded PE 105 (e.g., in terms of CPU load) exceeds a first threshold for at least a time threshold. For example, the controller 104 may determine whether CPULoadDiff is greater than CPULoadDifferenceThreshold for at least CPULoadDifferenceTimeThreshold. The least loaded PE 105 and the highest loaded PE 105 may be identified based on the respective CPU loads on each PE 105, as described above, e.g., with the lowest CPU load percentage and highest CPU load percentage, respectively. For example, CPULoadDifferenceThreshold and CPULoadDifferenceTimeThreshold may be set to 40% and 2 seconds, respectively, by default.

The controller 104 may also be configured to remain in the first mode when the processing load differential between the least loaded PE 105 and the highest loaded PE 105 does not exceed the first threshold for at least the time threshold.

The controller 104 may also be configured to, in response to the processing load differential between the least loaded PE and the highest loaded PE exceeding a first threshold for at least a time threshold, enter a second mode in which each new UE session is assigned to the least loaded PE (in terms of CPU load). For example, the controller 104 may enter the "Load" LoadAssignmentState to assign processing engine 105 to new UE 110 sessions based on the CPU load (e.g., CPU load percentage) of each processing engine 105.

Optionally, the controller 104 may be configured to determine 608 whether the processing load differential between the least loaded PE 105 and the highest loaded PE 105 falls below the first threshold. In response to the processing load differential between the least loaded PE and the highest loaded PE falling below a first threshold, the controller 104 may re-enter the first mode (e.g., "Session" LoadAssignmentState).

If, however, the processing load differential between the least loaded PE and the highest loaded PE does not below the first threshold, the controller 104 may remain in the second mode (e.g., "Load" LoadAssignmentState). For example, the controller 104 may stay in the "Load" LoadAssignmentState as long as the processing load differential between least and highest loaded PEs 105 (e.g., CPULoadDiff) is greater than the first threshold (e.g., CPULoadDifferenceTimeThreshold).

Session Redirection

When the incoming traffic to a controller 104 has good (e.g., appropriately high) turnover in terms of incoming and outgoing sessions, initial assignment/load balancing may be performed initially as described in the method 600 of FIG. 6, e.g., first using the session load on the PEs 105, then the CPU load depending on the processing load differential. However, there may still be certain scenarios when load imbalances arise and persist in the controller 104, especially when the sessions on the controller 104 remain static with very little turnover. In such situations, UEs 110 may be redirected (e.g., re-assigned) from overloaded PEs 105 to other PEs 105 to balance the load on the controller 104.

Every $T_{ave}$ period 146 when individual UE 110 loads are calculated based on their incoming packet rate (e.g., according to FIG. 5B), a table of UEs 110 may be created that places the UEs 110 in different load zones (or "buckets" or "bins") depending on their calculated load. In other words, each UEs 110 may be placed in one of the zones/buckets/bins depending on its load, e.g., without any sorting in any given zone or across the zones. The loads due to individual UEs 110 and the total load on the processing engine 105 may be derived from packet processing rate. Table 4 is an example that may be maintained for the UEs 110 belonging to each PE 105. In other words, a table similar to Table 4 may be maintained for each PE 105:

TABLE 4

Per PE table containing UEs in Different Traffic Load Ranges

| Processing Load Range for UEs | List of UE-ID(s) in the range |
| --- | --- |
| Greater than 90% | |
| Greater than 80% | |
| Greater than 70% | A |
| Greater than 60% | |
| Greater than 50% | |
| Greater than 40% | |
| Greater than 30% | |
| Greater than 20% | |
| Greater than 10% | |
| Less than 10% | M, N |

For example, a UE 110 with UE-ID A may be in the zone/bucket/bin for UEs 110 with a processing load range greater than 70% (and less than 80%). Similarly, UEs 110 with UE-IDs M and N may be in the zone/bucket/bin for UEs 110 with a processing load range less than 10%. In this way, the total load due to UEs 110 does not exceed 100%. It should be noted that any suitable number of zones (and boundaries between zones) may be used. Additionally, the UE-ID(s) may take any form, but preferably, the UE-ID is an integer value in order to aid lookups to tables that store related session information, e.g., the UE-ID LUT 142 and Bearer-ID LUT 144.

UEs 110 may be redirected in response to the processing load differential between a least loaded PE 105 and a highest loaded PE 110 exceeding the CPULoadDifferenceThreshold for UERedirectionTimeThreshold seconds. Monitoring the queue lengths corresponding to individual PEs 105 may provide a similar effect (though time-threshold-based redirection may be easier to implement).

The value of UERedirectionTimeThreshold may be configured to be a few (e.g., 1, 2, 3, 4, 5, etc.) seconds more than CPULoadDifferenceTimeThreshold (used for initial PE 105 assignment).

When the processing load differential between the least loaded PE 105 and the highest loaded PE 105 exceeds the CPULoadDifferenceThreshold for UERedirectionTimeThreshold seconds, one or more UEs 110 may be redirected from the most loaded PE 105 to least loaded PE 105 (in terms of CPU load). Using Table 4, the controller 104 (e.g., distributor/load balancer 134) may choose the most suitable set of UEs 110 to redirect from the most loaded PE 105 to the least loaded PE 105.

In other words, using the load contribution estimation described above, a table (similar to Table 4) may be created and maintained that groups UEs 110 according to the amount of load they are generating (on their respective PE 105). For example, UEs 110 with load contribution (on their respective PE 105) in the range of 10 to 20% (greater than 10, but not greater than 20) may be grouped at index 1. Similarly, UEs 110 that generate a load contribution (on their respective PE 105) in the range of 20% to 30% may be grouped at index 2, and so on.

Let "d" be the processing load differential between most loaded PE 105 and least loaded PE 105. The return value from the function round(d/2) may identify the amount of load to be redirected. Based on the amount of load to be redirected, the UEs 110 at the appropriate index (e.g., in Table 4) may be selected for redirection.

Specifically, the index (e.g., starting at 0) may be determined based on the number of zones/buckets/bins (M) in the table, e.g., 10 for Table 4. Additionally, 100/M is also the percentage range of each zone/bucket/bin in the table, e.g., 10 for Table 4. In terms of M, the index in the table (e.g., Table 4) may be determined using Equation (13):

$$index=CPULoadDiff/((2*100)/M) \qquad (13)$$

where CPULoadDiff is the load differential between a highest loaded PE 105 and a least loaded PE 105. In configurations where the index is not an integer, it may be rounded down to the nearest integer. Since M is 10 in Table 4, the index (for a 50% load differential) may be calculated as 50/((2*100)/M)=2.5, which may be rounded down to 2. UEs 110 at index 2 (in Table 4) may contribute a processing load range greater than 20% and less than 30%.

Put another way, the index may be based on the range of CPULoadDiff (which is a percentage in the examples discussed herein, e.g., 0-100%) and the percentage range (100/M) of individual entries in the table, e.g., index=((CPULoadDiff/2/range). Using Table 4, we have 10 entries, each entry holding UEs 110 in its respective 10% upper limit. In this example, the index (for a 50% load differential) may be calculated as ((50/2)/10)=2.5, which may be rounded down to 2. UEs 110 at index 2 (in Table 4) may contribute a processing load range greater than 20% and less than 30%.

M (and implicitly, the range 100/M) may be selected based on a tradeoff between (1) accuracy; and (2) the amount of resources used for creating/maintaining the table (e.g., Table 4) and determining indices for the table. For example, if we want the compensation to be more accurate, we can include 20 zones/buckets/bins in Table 4, e.g., where Table 4 may store UEs 110 in the range of 5% granularity. In this case (M=20), we need to use index=(CPULoadDiff/((2*100)/20)=(CPULoadDiff/(2*5)).

Similarly, if we want the compensation to be even more accurate, Table 4 can be created with 2% range (M=50), then we will use index=(CPULoadDiff/((2*100)/50)=(CPULoadDiff/(2*2)).

If there are no UEs 110 at the identified index (of Table 4), more UEs 110 from lower indices in Table 4 may be selected to fill the load differential gap, e.g., for redirection. It should be noted that if no UEs 110 are in the table (e.g., Table 4) at the identified index, a larger number of UEs 110 at the lower index may be required (to meet the load to be redirected) than the number of UEs 110 that could otherwise be taken from the identified index. For example, if one UE 110 at index 2 could be redirected to meet the load to be redirected, two UEs 110 at index 1 may be selected for redirection.

Figure 7:
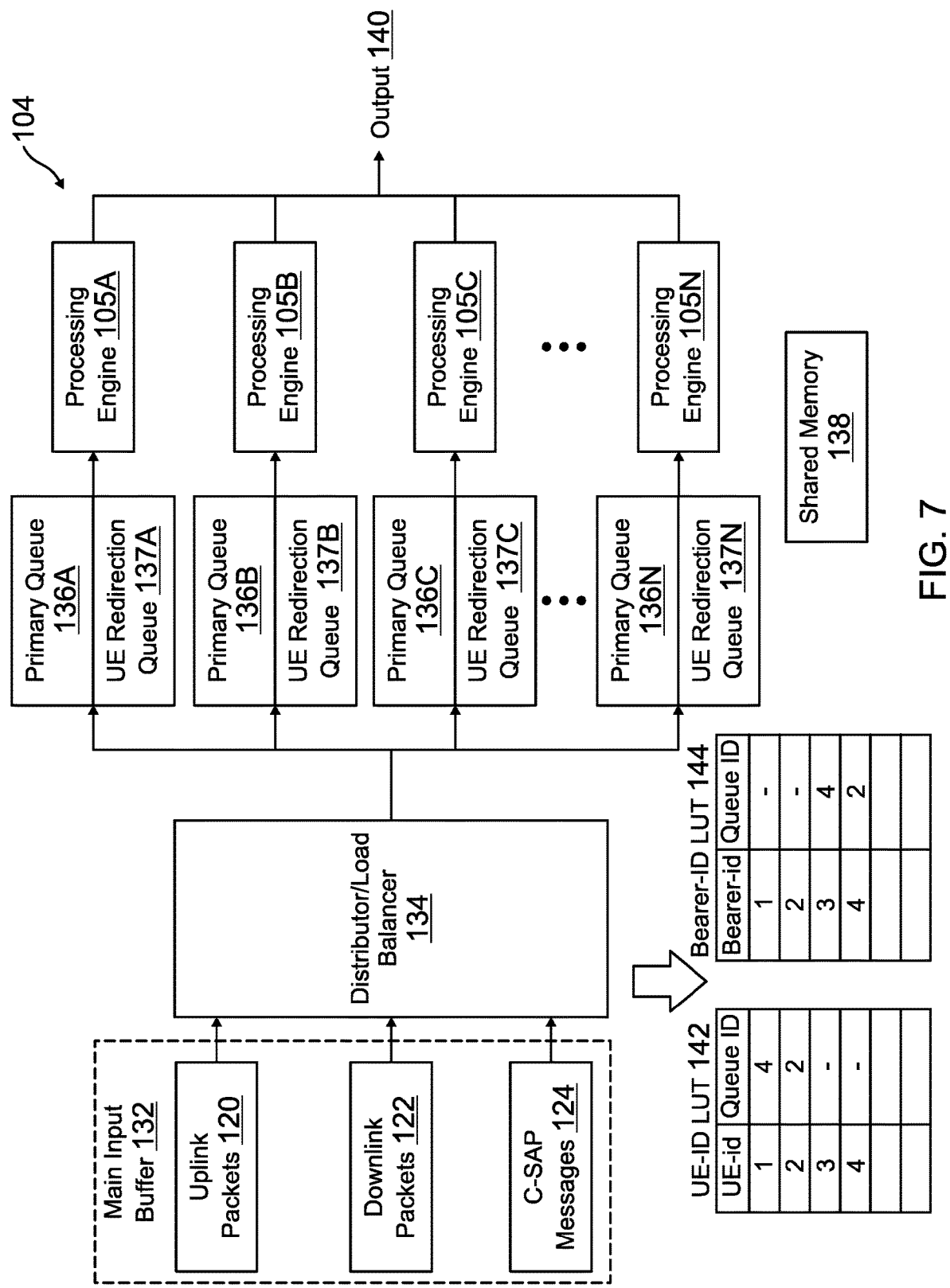
FIG. 7 is a block diagram illustrating an exemplary enhancement to a parallel processing architecture that enables seamless redirection of UE sessions from a source processing engine to a destination processing engine.

FIG. 7 is a block diagram illustrating an exemplary enhancement to a parallel processing architecture that enables seamless redirection of UE 110 sessions from a source PE 105 to a destination PE 105. The controller 104 illustrated in FIG. 7 may be configured similarly to the controller 104 illustrated in FIG. 3, e.g., the main input buffer 132, UE-ID LUT 142, Bearer-ID LUT 144, shared memory 138, and output 140 may correspond and function similar to their counterparts illustrated in FIG. 3. However, FIG. 7 illustrates a UE redirection queue 137A-N (in addition to a primary queue 136A-N) for each of the processing engines 105A-N in the controller 104. It should be noted that, even though the UE redirection queues 137 are not illustrated in FIG. 3, they may still be present in the controller 104 illustrated in FIG. 3. Furthermore, additional functionality of the distributor/load balancer 134 may be described in association with FIG. 7 (e.g., session redirection, etc.), however, the distributor/load balancer 134 in FIGS. 3 and 7 may each perform some or all of the functions in either configuration.

As mentioned above, it may be beneficial for the packets to/from a given UE 110 to be processed in order, e.g., order of arrival. The controller 104 in FIG. 7 provides an architectural improvement to typical parallel processing models that cannot avoid disruption (in terms of out-of-order packet processing) at the time of UE 110 redirection. Specifically, in order to ensure this processing order, the controller 104 may use two additional elements when redirecting a UE 110 from one PE 105 to another.

First, the controller 104 may utilize a UE redirection queue 137 for each processing engine 105. Typically (in parallel multiprocessing systems), a single queue may feed data to each processing engine 105. In contrast, the controller 104 may use two queues for each PE 105 in order to perform disruptionless redirection. The first type of queue, called the primary queues 136 may be used for normal operation when no redirection is in progress. The second type of queue, called the UE redirection queues 137, may be used only when UEs 110 are being moved/redirected from one PE 105 to another. Each UE redirection queue 137 may be associated with a respective flag (e.g., a DequeueStatus flag), which may be set to false by default, then set to true during redirection, and optionally back to false following redirection. Each UE redirection queue 137 and each primary queue 136 may have a unique identifier, referred to as Qid, to distinguish it from every other primary queues 137 and UE redirection queue 137.

Second, the controller 104 may utilize UE movement ready messages (not shown). This may be a new message from the distributor/load balancer 134 to a source PE 105 for the purpose of coordinating UE 110 movement/redirection. Each UE movement ready messages may include (1) a UE Movement Message ID (e.g., in a header) that uniquely identifies the UE movement ready message; (2) a Destination Qid that identifies the primary queue 136 and/or UE redirection queue 137 that at least one UE 110 is/are to be redirected to; and/or (3) a list of UE-IDs being moved.

After selecting a UE 110 for redirection from a source PE 105 to a destination PE 105, the distributor/load balancer 134 may (1) update the lookup table entry (e.g., the Queue ID field of the UE-ID LUT 142 and/or the Bearer-ID LUT 144) for the UE 110 being moved/redirected to point to the Qid of the UE redirection queue 137 of the chosen destination PE 105; and (2) insert a ready indication event (e.g., a UE movement ready message) into the primary queue 136 for the source PE 105. From this point onwards, all packets (pertaining to the session being redirected) may be placed in the UE redirection queue 137 for the destination PE 105. As long as the DequeueStatus of its UE redirection queue 137 is still false, the destination PE 105 preferably does not process its UE redirection queue 137 (though the source PE 105 may actively process packets/entries in its primary queue 136). After it encounters the ready indication event (e.g., the UE movement ready message) in its primary queue 136, the source PE 105 may set the DequeueStatus of the UE redirection queue 137 for the destination PE 105 to true. As the destination PE 105 detects that its UE redirection queue 137 status has changed, the destination PE 105 may change the lookup table entries (e.g., the Queue ID field of the UE-ID LUT 142 and/or the Bearer-ID LUT 144) for the UE 110 being moved/redirected to point to its own primary queue 136. The destination PE 105 may complete the processing of packets/entries in its UE redirection queue 137 before it moves back to processing its primary queue 136. Once the destination PE 105 completes processing packets/entries in its UE redirection queue 137, it may set the DequeueStatus back to false.

Figure 8:
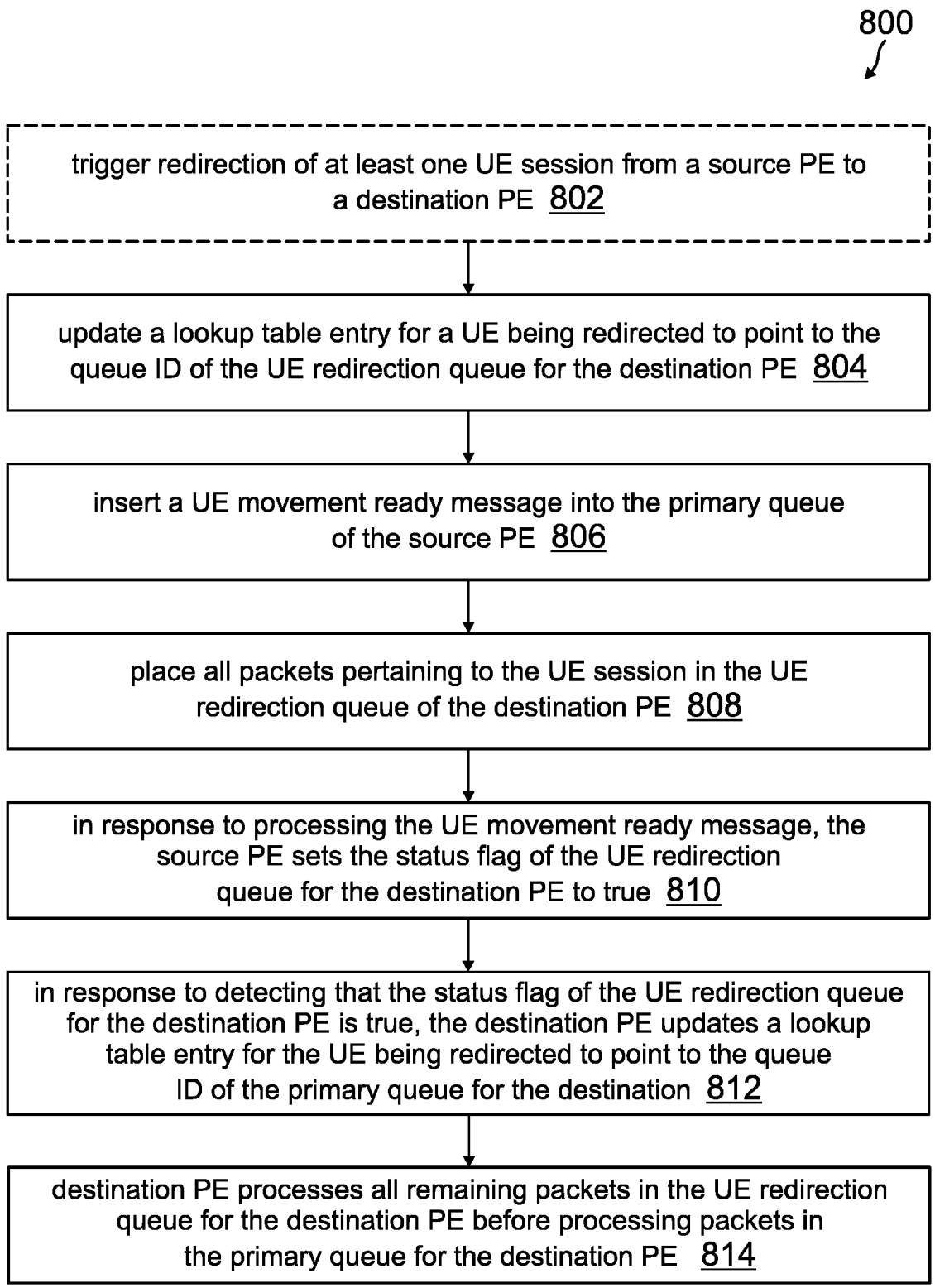
FIG. 8 is a flow diagram illustrating an exemplary method for redirecting a UE session from a source PE to a destination PE.

FIG. 8 is a flow diagram illustrating an exemplary method 800 for redirecting a UE 110 session from a source PE 105 to a destination PE 105. The method 800 may be performed by a controller 104, e.g., some combination of elements in a controller 104, such as a distributor/load balancer 134, processing engines 105, primary queues 136, and/or UE redirection queues 137.

The blocks of the flow diagram shown in FIG. 8 have been arranged in a generally sequential manner for ease of explanation; however, it is to be understood that this arrangement is merely exemplary, and it should be recognized that the processing associated with method 800 (and the blocks shown in FIG. 8) can occur in a different order (for example, where at least some of the processing associated with the blocks is performed in parallel and/or in an event-driven manner). Also, most standard exception handling is not described for ease of explanation; however, it is to be understood that method 800 can and typically would include such exception handling.

Optionally, the controller 104 may be configured to trigger 802 redirection of at least one UE 110 session from a source PE 105 to a destination PE 105. Redirection may be triggered in response to the processing load differential between a least loaded PE 105 and a highest loaded PE 105 exceeding the CPULoadDifferenceThreshold for UERedirectionTimeThreshold seconds.

The controller 104 (e.g., the distributor/load balancer 134) may also be configured to update 804 a lookup table (e.g., a UE-ID LUT 142 and/or a Bearer-ID LUT 144) entry for a UE 110 being redirected to point to the queue ID (e.g., Qid) of the UE redirection queue 137 for the destination PE 105, e.g., instead of the primary queue 136 of the source PE 105.

The controller 104 (e.g., the distributor/load balancer 134) may also be configured to insert 806 a UE movement ready message into the primary queue 136 of the source PE 105. Each UE movement ready messages may include (1) a UE Movement Message ID (e.g., in a header) that uniquely identifies the UE movement ready message; (2) a Destination Qid that identifies the primary queue 136 that at least one UE 110 is/are to be redirected to; and/or (3) a list of UE-IDs being moved.

The controller 104 (e.g., the distributor/load balancer 134) may also be configured to place 808 all packets pertaining to the UE 110 session in the UE redirection queue 137 of the destination PE 105. As long as the status flag of its UE redirection queue 137 is still false, the destination PE 105 preferably does not process its UE redirection queue 137 (though the source PE 105 may actively process packets/entries in its primary queue 136).

In response to processing the UE movement ready message, the controller 104 (e.g., the source PE 105) may also be configured to set 810 the status flag (e.g., DequeueStatus flag) of the UE redirection queue 137 for the destination PE 105 to true. For example, the status flag for each respective UE redirection queue 137 may be set to false by default, then set to true during redirection (and back to false when redirection is complete).

In response to detecting that the status flag of the UE redirection queue 137 for the destination PE 105 is true, the controller 104 (e.g., the destination PE 105) may also be configured to update 812 a lookup table (e.g., a UE-ID LUT 142 and/or a Bearer-ID LUT 144) entry for the UE 110 being redirected to point to the queue ID (e.g., Qid) of the primary queue 136 for the destination PE 105.

The controller 104 (e.g., the destination PE 105) may also be configured to process 814 all remaining packets in the UE redirection queue 137 for the destination PE 105 before processing packets in the primary queue 136 for the destination PE 105.

Figure 9:
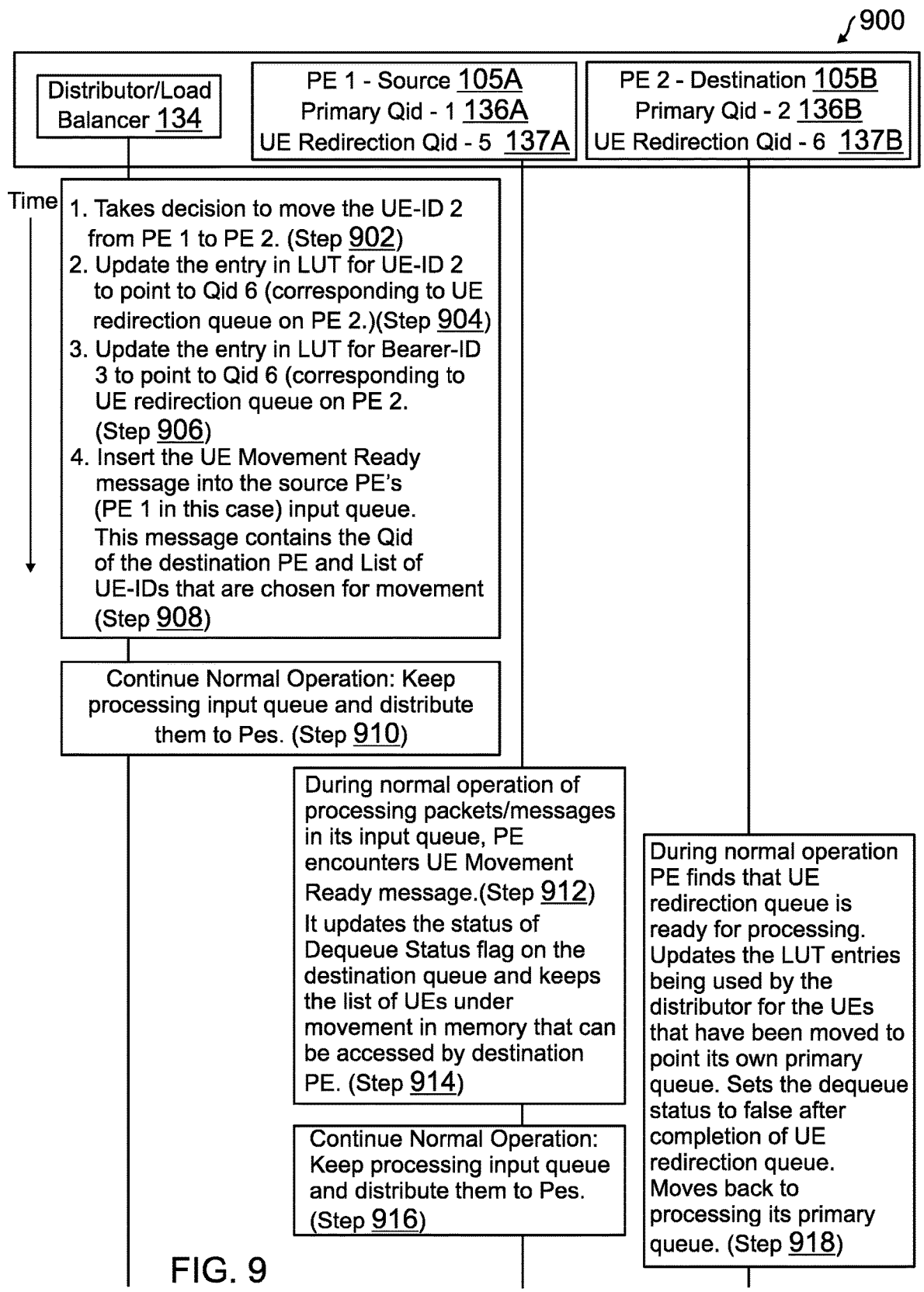
FIG. 9 is a sequence diagram illustrating a specific exemplary method for redirecting a UE session from a source PE to a destination PE.

FIG. 9 is a sequence diagram illustrating a specific exemplary method 900 for redirecting a UE 110 session from a source PE 105 to a destination PE 105. The method 900 may be performed by a controller 104, e.g., some combination of elements in a controller 104, such as a distributor/load balancer 134, processing engines 105, primary queues 136, and/or UE redirection queues 137.

Specifically, the method 900 illustrates how a controller 104 may redirect a UE session from a first PE (PE 1) 105A to a second PE (PE 2) 105B. In this example, the Qid of the primary queue 136A and the UE redirection queue 137A for PE 1 105A are "1" and "5", respectively. Furthermore, the Qid of the primary queue 136B and UE redirection queue 137B for PE 2 105B are "2" and "6", respectively.

In step 902, the distributor/load balancer 134 may trigger redirection of the UE session, e.g., to move the UE-ID "2" from PE 1 105A to PE 2 105B. Redirection may be triggered in response to the processing load differential between a least loaded PE 105 and a highest loaded PE 105 exceeding the CPULoadDifferenceThreshold for UERedirectionTimeThreshold seconds.

In step 904, the distributor/load balancer 134 may update the entry in a lookup table (e.g., the UE-ID LUT 142) for UE-ID 2 to point to Qid 6 (corresponding to the Qid 6 for the UE redirection queue 137B for PE 2 105B, e.g., instead of Qid 1 for the primary queue 136A for PE 1 105A.

In step 906, the distributor/load balancer 134 may update the entry in a lookup table (e.g., the Bearer-ID LUT 144) for Bearer-ID 3 to point to Qid 6 (corresponding to the Qid 6 for the UE redirection queue 137B for PE 2 105B, e.g., instead of Qid 1 for the primary queue 136A for PE 1 105A.

In step 908, the distributor/load balancer 134 may insert a UE Movement Ready message into the source PE's (PE 1 105A in this case) input/primary queue 136A. As discussed above, the UE Movement Ready message may contain the Qid that identifies the primary queue 136B of PE 2 105B and the list of UE-IDs that are being moved/redirected.

In step 910, the distributor/load balancer 134 may continue normal operation, e.g., processing the main input buffer 132 and passing packets to the PEs 105. Since the status flag of the UE redirection queue 137 of PE 2 105B is still false, PE 2 105B does not process its UE redirection queue 137B, and PE 1 105A actively processes packets in its primary queue 136A.

In step 912, during normal operation of processing packets in its primary queue 136A, PE 1 105A may encounter the UE Movement Ready message. In step 914, PE 1 105A may update the status of the DequeueStatus flag on the UE redirection queue 137B for PE 2 105B and keep the list of UEs 110 under movement/redirection in memory that can be accessed by PE 2 105B. In step 916, PE 1 105A may continue normal operation and keep processing its primary queue 136A.

However, in step 918, PE 2 105B may determine that its UE redirection queue 137B is ready for processing, e.g., that the DequeueStatus flag on the UE redirection queue 137B for PE 2 105B is set to true. In response, PE 2 105B may update the LUT entries being used by the distributor/load balancer 134 (e.g., the UE-ID LUT 142 and/or the Bearer-ID LUT 144) for the UEs 110 that have been moved to point to its own primary queue 136B. PE 2 105B may also complete processing of packets in its UE redirection queue 137B. PE 2 105B may also set the DequeueStatus flag on its UE redirection queue 137B to false after processing all packets in the UE redirection queue 137B. PE 2 105B may then return to processing its primary queue 136B.

SUMMARY

In general, the present systems and methods address the problem of load balancing for packet processing in parallel processing systems, and particularly in an eNB with distributed architecture, e.g., as shown in FIG. 1. This includes load measurement and UE redirection.

First, load measurement on processing engines is described. The load measurement may measure processing load on processors involved in packet processing based on packet rate. This is done based on packet counts that may be normally maintained in an eNB. In addition to contributing to efficient load balancing, this method may also remove dependency on platform Application Programming Interfaces (APIs) for providing means to measure processing load on a processor. This may be particularly useful when the processor is shared by modules performing different functions by way of multithreading. Using this method, it is possible to accurately estimate contribution of packet processing thread(s) to the overall processing load on a CPU.

Second, individual UE load measurements are described. In addition the load measurement on processing engines, the load from the individual UEs may also be estimated based on the packet rate generated by them. By combining the two different load measurements, the total load may be represented as a sum of processing loads of individual UEs. This may enables the selection the best possible set of UEs for redirection when load imbalance is detected.

Third, the present systems and methods describe an improved parallel processing model that makes redirection of UEs from one PE to another disruptionless (with regard to packet processing order, delay etc.).

Fourth, the present systems and methods describe a new method for choosing a processing engine to be assigned to a new UE session. This selection may consider both session load and processing load on the PEs. This may have benefits over conventional algorithms that choose PE with least processing load.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks. The transmission medium used by a network may include coaxial cable, fiber optic cable, twisted pair, digital subscriber line (DSL), or combinations thereof. Wireless networks may also use air as a transmission medium.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The techniques introduced here may be embodied as special-purpose hardware (such as circuitry), as programmable circuitry appropriately programmed with software and/or firmware, or as a combination of special-purpose and programmable circuitry. Hence, configurations may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements for load measurement and load balancing for packet processing in an LTE evolved Node B. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Configurations

Example 1 includes a controller that processes signals in a baseband frequency band, the controller comprising: a plurality of processing engines (PEs); and a distributor/load balancer that comprises at least one processor or processing core, wherein the at least one processor or processing core is configured to: enter a first mode in which each new UE session is assigned to a PE that is currently processing a fewest number of UE sessions; determine whether a processing load differential between a least loaded PE and a highest loaded PE exceed a first threshold for at least a time threshold; and in response to the processing load differential between the least loaded PE and the highest loaded PE exceeding the first threshold for at least the time threshold, enter a second mode in which each new UE session is assigned to the least loaded PE.

Example 2 includes the controller of Example 1, wherein the at least one processor or processing core is further configured to: determine whether the processing load differential between the least loaded PE and the highest loaded PE falls below the first threshold; when the processing load differential between the least loaded PE and the highest loaded PE falls below the first threshold, re-enter the first mode; and when the processing load differential between the least loaded PE and the highest loaded PE remains above the first threshold, remain in the second mode.

Example 3 includes the controller of any of Examples 1-2, wherein the at least one processor or processing core is further configured to determine the least loaded PE and the highest loaded PE.

Example 4 includes the controller of Example 3, wherein, in order to determine the least loaded PE and the highest loaded PE, the at least one processor or processing core is further configured to: for each PE in the controller, measure a packet rate for each of at least a first type, a second type of packets, and a third type of packets that are processed by a processing engine; determine an equivalent packet rate of the second and third types of packets, in terms of the first type of packets; sum the measured packet rate of the first type of packets, a weighted equivalent packet rate of the second type of packet, and a weighted equivalent packet rate of the third type of packet to determine an equivalent aggregate packet rate; and determine an aggregate load percentage for the processing engine based on the equivalent aggregate packet rate.

Example 5 includes the controller of Example 4, wherein the at least one processor or processing core is further configured to: determine that the PE with the lowest aggregate load percentage is the least loaded PE; and determine that the PE with the highest aggregate load percentage is the highest loaded PE.

Example 6 includes the controller of any of Examples 3-5, wherein the at least one processor or processing core is further configured to trigger redirection of a UE session from a source PE to a destination PE in response to a processing load differential between the least loaded PE and the highest loaded PE exceeding a first threshold for a time threshold.

Example 7 includes the controller of any of Examples 3-6, wherein, in order to determine a suitable set of UEs to redirect from a source PE to a destination PE in response to a processing load differential between the least loaded PE and the highest loaded PE, the at least one processor or processing core is further configured to: for each UE in the controller, measuring a packet rate for each of at least a first type, a second type of packets, and a third type of packets that are processed by a serving PE; determining an equivalent packet rate of the second and third types of packets, in terms of the first type of packets; summing the measured packet rate of the first type of packets, a weighted equivalent packet rate of the second type of packet, and a weighted equivalent packet rate of the third type of packet to determine an equivalent aggregate packet rate; and determining an aggregate load percentage for the serving PE based on the equivalent aggregate packet rate contributed by the respective UE; and based on the determined aggregate load percentage of each UE, placing the respective UE in a lookup table with a suitable number of bins where each bin represents a particular range or interval.

Example 8 includes the controller of any of Examples 3-7, wherein the at least one processor or processing core is further configured to determine a set of UEs with UE sessions to be redirected by: determining a processing load differential between the least loaded PE and the highest loaded PE; determining an amount of load to be transferred by dividing the processing load differential by two and rounding to a nearest integer; determining an index for a lookup table based on the processing load differential and a number of bins in the lookup table, wherein the lookup table groups UEs according to a processing load range of the respective UE on a respective PE; and when the lookup table includes at least one UE at the index, selecting a number of the at least one UE for redirection; and when the lookup table does not include at least one UE at the index, search for other UEs for redirection at a next lowest index of the lookup table.

Example 9 includes the controller of any of Examples 6-8, wherein, in response to redirection being triggered, the at least one processor or processing core is further configured to redirect the UE session from the source PE to the destination PE.

Example 10 includes the controller of Example 9, wherein, in order to redirect the UE session from the source PE to the destination PE, the at least one processor or processing core is further configured to: update a lookup table entry for a UE being redirected to point to a queue ID of a UE redirection queue for the destination PE; insert a UE movement ready message into a primary queue of the source PE; and place all packets pertaining to the UE session in the UE redirection queue of the destination PE.

Example 11 includes the controller of Example 10, wherein, in order to redirect the UE session from the source PE to the destination PE: in response to processing the UE movement ready message, the source PE sets the status flag of the UE redirection queue for the destination PE to true; in response to detecting that the status flag of the UE redirection queue for the destination PE is true, the destination PE updates a lookup table entry for the UE being redirected to point to the queue ID of the primary queue for the destination PE; and the destination PE processes all remaining packets in the UE redirection queue for the destination PE before processing packets in the primary queue for the destination PE.

Example 12 includes the controller of any of Examples 1-11, wherein each PE in the controller is one of multiple cores in a processor.

Example 13 includes the controller of any of Examples 1-12, wherein the controller is in a centralized radio access network (C-RAN) implementing a Long Term Evolution (LTE) Evolved Node B (eNB) that also comprises a plurality of radio points configured to exchange radio frequency (RF) signals with a plurality of user equipment (UEs), wherein the controller is located in a location that is physically remote from the radio points.

Example 14 includes a method performed by a controller that includes a plurality of processing engines (PEs) and a distributor/load balancer, the method comprising: entering a first mode in which each new UE session is assigned to a PE that is currently processing a fewest number of UE sessions; determining whether a processing load differential between a least loaded PE and a highest loaded PE exceed a first threshold for at least a time threshold; and in response to the processing load differential between the least loaded PE and the highest loaded PE exceeding the first threshold for at least the time threshold, entering a second mode in which each new UE session is assigned to the least loaded PE.

Example 15 includes the method of Example 14, further comprising: determining whether the processing load differential between the least loaded PE and the highest loaded PE falls below the first threshold; when the processing load differential between the least loaded PE and the highest loaded PE falls below the first threshold, re-entering the first mode; and when the processing load differential between the least loaded PE and the highest loaded PE remains above the first threshold, remaining in the second mode.

Example 16 includes the method of any of Examples 14-15, wherein further comprising determining the least loaded PE and the highest loaded PE.

Example 17 includes the method of Example 16, further comprising: for each PE in the controller, measuring a packet rate for each of at least a first type, a second type of packets, and a third type of packets that are processed by a processing engine; determining an equivalent packet rate of the second and third types of packets, in terms of the first type of packets; summing the measured packet rate of the first type of packets, a weighted equivalent packet rate of the second type of packet, and a weighted equivalent packet rate of the third type of packet to determine an equivalent aggregate packet rate; and determining an aggregate load percentage for the processing engine based on the equivalent aggregate packet rate.

Example 18 includes the method of Example 17, further comprising: determining that the PE with the lowest aggregate load percentage is the least loaded PE; and determining that the PE with the highest aggregate load percentage is the highest loaded PE.

Example 19 includes the method of any of Examples 16-18, further comprising triggering redirection of a UE session from a source PE to a destination PE in response to a processing load differential between the least loaded PE and the highest loaded PE exceeding a first threshold for a time threshold.

Example 20 includes the method of any of Examples 16-19, wherein, in order to determine a suitable set of UEs to redirect from a source PE to a destination PE in response to a processing load differential between the least loaded PE and the highest loaded PE, the method further comprises: for each UE in the controller, measuring a packet rate for each of at least a first type, a second type of packets, and a third type of packets that are processed by a serving PE; determining an equivalent packet rate of the second and third types of packets, in terms of the first type of packets; summing the measured packet rate of the first type of packets, a weighted equivalent packet rate of the second type of packet, and a weighted equivalent packet rate of the third type of packet to determine an equivalent aggregate packet rate; and determining an aggregate load percentage for the serving PE based on the equivalent aggregate packet rate contributed by the respective UE; and based on the determined aggregate load percentage of each UE, placing the respective UE in a lookup table with a suitable number of bins where each bin represents a particular range or interval.

Example 21 includes the method of any of Examples 16-20, further comprising determining a set of UE sessions for redirection by: determining a processing load differential between the least loaded PE and the highest loaded PE; determining an amount of load to be transferred by dividing the processing load differential by two and rounding to a nearest integer; determining an index for a lookup table based on the processing load differential and a number of bins in the lookup table, wherein the lookup table groups UEs according to a processing load range of the respective UE on a respective PE; and when the lookup table includes at least one UE at the index, selecting a number of the at least one UE for redirection; and when the lookup table does not include at least one UE at the index, search for other UEs for redirection at a next lowest index of the lookup table.

Example 22 includes the method of any of Examples 19-21, further comprising, in response to redirection being triggered, redirecting the UE session from the source PE to the destination PE.

Example 23 includes the method of Example 22, further comprising: updating a lookup table entry for a UE being redirected to point to a queue ID of a UE redirection queue for the destination PE; inserting a UE movement ready message into a primary queue of the source PE; and placing all packets pertaining to the UE session in the UE redirection queue of the destination PE.

Example 24 includes the method of Example 23, further comprising: in response to processing the UE movement ready message, the source PE sets the status flag of the UE redirection queue for the destination PE to true; in response to detecting that the status flag of the UE redirection queue for the destination PE is true, the destination PE updates a lookup table entry for the UE being redirected to point to the queue ID of the primary queue for the destination PE; and the destination PE processes all remaining packets in the UE redirection queue for the destination PE before processing packets in the primary queue for the destination PE.

Example 25 includes the method of any of Examples 14-24, wherein each PE in the controller is one of multiple cores in a processor.

Example 26 includes the method of any of Examples 14-25, wherein the controller is in a centralized radio access network (C-RAN) implementing a Long Term Evolution (LTE) Evolved Node B (eNB) that also comprises a plurality of radio points configured to exchange radio frequency (RF) signals with a plurality of user equipment (UEs), wherein the controller is located in a location that is physically remote from the radio points.

The invention claimed is:

1. A controller that processes signals in a baseband frequency band, the controller comprising:
   a plurality of processing engines (PEs), each PE implemented in a respective processing core or processing thread; and
   a distributor/load balancer that comprises at least one processor or processing core, wherein the at least one processor or processing core is configured to:
      enter a first mode in which each new UE session is assigned to a PE that is currently processing a fewest number of UE sessions;
      determine whether a processing load differential between a least loaded PE and a highest loaded PE has exceeded a first threshold for at least a predetermined amount of time; and
      in response to determining that the processing load differential between the least loaded PE and the highest loaded PE has exceeded the first threshold for at least the predetermined amount of time, enter a second mode in which each new UE session is assigned to the least loaded PE.

2. The controller of claim 1, wherein the at least one processor or processing core is further configured to:
   determine whether the processing load differential between the least loaded PE and the highest loaded PE falls below the first threshold;
   when the processing load differential between the least loaded PE and the highest loaded PE falls below the first threshold, re-enter the first mode; and
   when the processing load differential between the least loaded PE and the highest loaded PE remains above the first threshold, remain in the second mode.

3. The controller of claim 1, wherein the at least one processor or processing core is further configured to determine the least loaded PE and the highest loaded PE.

4. The controller of claim 3, wherein, in order to determine the least loaded PE and the highest loaded PE, the at least one processor or processing core is further configured to:
   for each PE in the controller,
      measure a packet rate for each of at least a first type of packets, a second type of packets, and a third type of packets that are processed by a processing engine;
      determine an equivalent packet rate of the second and third types of packets, in terms of the first type of packets;
      sum the measured packet rate of the first type of packets, a weighted equivalent packet rate of the second type of packets, and a weighted equivalent packet rate of the third type of packets to determine an equivalent aggregate packet rate; and
      determine an aggregate load percentage for the processing engine based on the equivalent aggregate packet rate.

5. The controller of claim 4, wherein the at least one processor or processing core is further configured to:
  determine that the PE with a lowest aggregate load percentage is the least loaded PE; and
  determine that the PE with a highest aggregate load percentage is the highest loaded PE.

6. The controller of claim 3, wherein the at least one processor or processing core is further configured to trigger redirection of a UE session from a source PE to a destination PE in response to determining that the processing load differential between the least loaded PE and the highest loaded PE has exceeded the first threshold for at least the predetermined amount of time.

7. The controller of claim 6, wherein, in response to redirection being triggered, the at least one processor or processing core is further configured to redirect the UE session from the source PE to the destination PE.

8. The controller of claim 7, wherein, in order to redirect the UE session from the source PE to the destination PE, the at least one processor or processing core is further configured to:
  update a lookup table entry for a UE being redirected to point to a queue ID of a UE redirection queue for the destination PE;
  insert a UE movement ready message into a primary queue of the source PE; and
  place all packets pertaining to the UE session in the UE redirection queue of the destination PE.

9. The controller of claim 8, wherein, in order to redirect the UE session from the source PE to the destination PE:
  in response to processing the UE movement ready message, the source PE sets a status flag of the UE redirection queue for the destination PE to true;
  in response to detecting that the status flag of the UE redirection queue for the destination PE is true, the destination PE updates a lookup table entry for the UE being redirected to point to the queue ID of the primary queue for the destination PE; and
  the destination PE processes all remaining packets in the UE redirection queue for the destination PE before processing packets in the primary queue for the destination PE.

10. The controller of claim 3, wherein, in order to determine a suitable set of UEs to redirect from a source PE to a destination PE in response to determining that the processing load differential between the least loaded PE and the highest loaded PE has exceeded the first threshold for at least the predetermined amount of time, the at least one processor or processing core is further configured to:
  for each UE in the controller,
    measuring a packet rate for each of at least a first type of packets, a second type of packets, and a third type of packets that are processed by a serving PE;
    determining an equivalent packet rate of the second and third types of packets, in terms of the first type of packets;
    summing the measured packet rate of the first type of packets, a weighted equivalent packet rate of the second type of packets, and a weighted equivalent packet rate of the third type of packets to determine an equivalent aggregate packet rate; and
    determining an aggregate load percentage for the serving PE based on the equivalent aggregate packet rate contributed by the respective UE; and
  based on the determined aggregate load percentage of each UE, placing the respective UE in a lookup table with a suitable number of bins where each bin represents a particular range or interval.

11. The controller of claim 3, wherein the at least one processor or processing core is further configured to determine a set of UEs with UE sessions to be redirected by:
  determining a processing load differential between the least loaded PE and the highest loaded PE;
  determining an amount of load to be transferred by dividing the processing load differential by two and rounding to a nearest integer;
  determining an index for a lookup table based on the processing load differential and a number of bins in the lookup table, wherein the lookup table groups each UE served by the controller according to a processing load range of the respective UE on a respective PE;
  when the lookup table includes at least one UE at the index, selecting a number of the at least one UE for redirection; and
  when the lookup table does not include at least one UE at the index, search for other UEs for redirection at a next lowest index of the lookup table.

12. The controller of claim 1, wherein each PE in the controller is one of multiple cores in a processor.

13. The controller of claim 1, wherein the controller is in a centralized radio access network (C-RAN) implementing a Long Term Evolution (LTE) Evolved Node B (eNB) that also comprises a plurality of radio points configured to exchange radio frequency (RF) signals with a plurality of user equipment (UEs), wherein the controller is located in a location that is physically remote from the plurality of radio points.

14. The method of claim 1, wherein the at least one processor or processing core is further configured to determine the least loaded PE and the highest loaded PE by, for each PE in the controller:
  measuring a packet rate for each of at least a first type of packets, a second type of packets, and a third type of packets that are processed by a processing engine;
  determining an aggregate load percentage for the processing engine based on the measured packet rate of the first type of packets, the second type of packets, and the third type of packets.

15. The method of claim 1, wherein each PE implemented in a respective processing core or processing thread in the controller, which is implemented as a single physical device.

16. A method performed by a controller that includes a plurality of processing engines (PEs), each PE implemented in a respective processing core or processing thread, and a distributor/load balancer, the method comprising:
  entering a first mode in which each new UE session is assigned to a PE that is currently processing a fewest number of UE sessions;
  determining whether a processing load differential between a least loaded PE and a highest loaded PE has exceeded a first threshold for at least a predetermined amount of time; and
  in response to determining that the processing load differential between the least loaded PE and the highest loaded PE has exceeded the first threshold for at least the predetermined amount of time, entering a second mode in which each new UE session is assigned to the least loaded PE.

17. The method of claim 16, further comprising:
  determining whether the processing load differential between the least loaded PE and the highest loaded PE falls below the first threshold;

when the processing load differential between the least loaded PE and the highest loaded PE falls below the first threshold, re-entering the first mode; and when the processing load differential between the least loaded PE and the highest loaded PE remains above the first threshold, remaining in the second mode.

18. The method of claim 16, wherein further comprising determining the least loaded PE and the highest loaded PE.

19. The method of claim 18, further comprising:
for each PE in the controller,
measuring a packet rate for each of at least a first type of packets, a second type of packets, and a third type of packets that are processed by a processing engine;
determining an equivalent packet rate of the second and third types of packets, in terms of the first type of packets;
summing the measured packet rate of the first type of packets, a weighted equivalent packet rate of the second type of packets, and a weighted equivalent packet rate of the third type of packets to determine an equivalent aggregate packet rate; and
determining an aggregate load percentage for the processing engine based on the equivalent aggregate packet rate.

20. The method of claim 19, further comprising:
determining that the PE with a lowest aggregate load percentage is the least loaded PE; and
determining that the PE with a highest aggregate load percentage is the highest loaded PE.

21. The method of claim 18, further comprising triggering redirection of a UE session from a source PE to a destination PE in response to determining that the processing load differential between the least loaded PE and the highest loaded PE has exceeded the first threshold for at least the predetermined amount of time.

22. The method of claim 21, further comprising, in response to redirection being triggered, redirecting the UE session from the source PE to the destination PE.

23. The method of claim 22, further comprising:
updating a lookup table entry for a UE being redirected to point to a queue ID of a UE redirection queue for the destination PE;
inserting a UE movement ready message into a primary queue of the source PE; and
placing all packets pertaining to the UE session in the UE redirection queue of the destination PE.

24. The method of claim 23, further comprising:
in response to processing the UE movement ready message, the source PE sets a status flag of the UE redirection queue for the destination PE to true;
in response to detecting that the status flag of the UE redirection queue for the destination PE is true, the destination PE updates a lookup table entry for the UE being redirected to point to the queue ID of the primary queue for the destination PE; and
the destination PE processes all remaining packets in the UE redirection queue for the destination PE before processing packets in the primary queue for the destination PE.

25. The method of claim 18, wherein, in order to determine a suitable set of UEs to redirect from a source PE to a destination PE in response to determining that the processing load differential between the least loaded PE and the highest loaded PE has exceeded the first threshold for at least the predetermined amount of time, the method further comprises:
for each UE in the controller,
measuring a packet rate for each of at least a first type of packets, a second type of packets, and a third type of packets that are processed by a serving PE;
determining an equivalent packet rate of the second and third types of packets, in terms of the first type of packets;
summing the measured packet rate of the first type of packets, a weighted equivalent packet rate of the second type of packets, and a weighted equivalent packet rate of the third type of packets to determine an equivalent aggregate packet rate; and
determining an aggregate load percentage for the serving PE based on the equivalent aggregate packet rate contributed by the respective UE; and
based on the determined aggregate load percentage of each UE, placing the respective UE in a lookup table with a suitable number of bins where each bin represents a particular range or interval.

26. The method of claim 18, further comprising determining a set of UE sessions for redirection by:
determining a processing load differential between the least loaded PE and the highest loaded PE;
determining an amount of load to be transferred by dividing the processing load differential by two and rounding to a nearest integer;
determining an index for a lookup table based on the processing load differential and a number of bins in the lookup table, wherein the lookup table groups each UE served by the controller according to a processing load range of the respective UE on a respective PE;
when the lookup table includes at least one UE at the index, selecting a number of the at least one UE for redirection; and
when the lookup table does not include at least one UE at the index, search for other UEs for redirection at a next lowest index of the lookup table.

27. The method of claim 16, wherein each PE in the controller is one of multiple cores in a processor.

28. The method of claim 16, wherein the controller is in a centralized radio access network (C-RAN) implementing a Long Term Evolution (LTE) Evolved Node B (eNB) that also comprises a plurality of radio points configured to exchange radio frequency (RF) signals with a plurality of user equipment (UEs), wherein the controller is located in a location that is physically remote from the plurality of radio points.

* * * * *